United States Patent
Duan et al.

(10) Patent No.: US 12,219,493 B2
(45) Date of Patent: *Feb. 4, 2025

(54) SRS ANTENNA SWITCHING FOR MULTIPLE RECEIVE ANTENNAS

(71) Applicant: QUALCOMM Incorporated, San Diego, CA (US)

(72) Inventors: Weimin Duan, San Diego, CA (US); Alexandros Manolakos, Escondido, CA (US); Muhammad Sayed Khairy Abdelghaffar, San Jose, CA (US); Pavan Kumar Vitthaladevuni, San Diego, CA (US); Krishna Kiran Mukkavilli, San Diego, CA (US); Runxin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,315

(22) Filed: Apr. 12, 2023

(65) Prior Publication Data
US 2023/0247558 A1 Aug. 3, 2023

Related U.S. Application Data

(63) Continuation of application No. 17/066,115, filed on Oct. 8, 2020, now Pat. No. 11,638,217.

(30) Foreign Application Priority Data

Oct. 9, 2019 (GR) .............................. 20190100448
Jan. 15, 2020 (GR) .............................. 20200100013

(51) Int. Cl.
H04W 52/02 (2009.01)
H04B 7/0404 (2017.01)
(Continued)

(52) U.S. Cl.
CPC ...... *H04W 52/0274* (2013.01); *H04B 7/0404* (2013.01); *H04L 5/0051* (2013.01);
(Continued)

(58) Field of Classification Search
CPC ... H04L 5/0023; H04L 5/0051; H04L 5/0094; H04L 25/0226; H04B 7/0404;
(Continued)

(56) References Cited

U.S. PATENT DOCUMENTS 11,277,176 B2 * 3/2022 Zhang .................. H04B 7/0404
2015/0304994 A1 10/2015 Kim
(Continued)

FOREIGN PATENT DOCUMENTS

CN 110945824 A 3/2020
EP 3661097 A1 6/2020
(Continued)

OTHER PUBLICATIONS

"3rd Generation Partnership Project; Technical Specification Group Radio Access Network; NR; Physical Channels and Modulation (Release 15)", 3GPP Standard; Technical Specification; 3GPP TS 38.211, 3rd Generation Partnership Project (3GPP), Mobile Competence Centre, 650, Route Des Lucioles, F-06921, Sophia-Antipolis Cedex, France, vol. RAN WG1, No. V15.7.0, Sep. 28, 2019 (Sep. 28, 2019), pp. 1-93, XP051785087, p. 71, paragraph 6.4.1.4—p. 76.

(Continued)

*Primary Examiner* — Pao Sinkantarakorn
(74) *Attorney, Agent, or Firm* — Harrity & Harrity LLP / Qualcomm

(57) ABSTRACT

This disclosure provides methods, devices and systems for channel sounding for wireless communications. Some implementations more specifically relate to scheduling sounding reference signal (SRS) resource sets for wireless (Continued)

devices having more than 4 receive (RX) antenna ports. In some implementations, a base station may determine an antenna switching capability of a user equipment (UE). The antenna switching capability indicates a number of RX antenna ports of the UE. The base station schedules a number of SRS resource sets for the UE based at least in part on the number of RX antenna ports in excess of four. For example, the number of RX antenna ports may be equal to 8. As another example, the number of RX antenna ports may be equal to 6. The base station further receives, from the UE, uplink transmissions of one or more SRS resources for each of the scheduled SRS resource sets.

20 Claims, 15 Drawing Sheets

(51) Int. Cl.
*H04L 5/00* (2006.01)
*H04W 72/044* (2023.01)
*H04W 72/21* (2023.01)
*H04W 72/51* (2023.01)

(52) U.S. Cl.
CPC ......... *H04W 72/044* (2013.01); *H04W 72/21* (2023.01); *H04W 72/51* (2023.01)

(58) Field of Classification Search
CPC ............ H04B 7/0817; H04W 52/0274; H04W 72/0413; H04W 72/044; H04W 72/048
See application file for complete search history.

(56) References Cited

U.S. PATENT DOCUMENTS

| | | |
|---|---|---|
| 2021/0013936 A1 | 1/2021 | Zhu et al. |
| 2021/0013947 A1 | 1/2021 | Dou et al. |
| 2021/0014794 A1 | 1/2021 | Jiang et al. |
| 2021/0021391 A1* | 1/2021 | Wang ................... H04L 5/0048 |
| 2021/0044458 A1 | 2/2021 | Gao et al. |
| 2021/0112498 A1 | 4/2021 | Duan et al. |
| 2021/0194737 A1 | 6/2021 | Gao et al. |
| 2021/0297291 A1 | 9/2021 | Jin et al. |
| 2022/0086875 A1* | 3/2022 | Xu ......................... H04L 5/0053 |

FOREIGN PATENT DOCUMENTS

| | | |
|---|---|---|
| EP | 3687099 A1 | 7/2020 |
| WO | 2019022329 A1 | 1/2019 |
| WO | 2019160775 | 8/2019 |
| WO | 2019164309 A1 | 8/2019 |

OTHER PUBLICATIONS

International Preliminary Report on Patentability—PCT/US2020/054935, The International Bureau of WIPO—Geneva, Switzerland, Apr. 21, 2022.
International Search Report and Written Opinion—PCT/US2020/054935—ISA/EPO—Feb. 1, 2021.
Qualcomm Incorporated: "SRS Antenna Switching for 1T4R and 2T4R", 3GPP TSG-RAN WG1 Meeting #92bis, R1-1805278 SRS Antenna Switching Rev, 3rd Generation Partnership Project, Mobile Competence Centre; 650, Route Des Lucioles; F-06921 Sophia-Antipolis Cedex; France, vol. RAN WG1, No. Sanya, China, Apr. 16, 2018-Apr. 20, 2018, Apr. 15, 2018, XP051427507, 19 pages, the whole document, Section 2, Section 4.

* cited by examiner

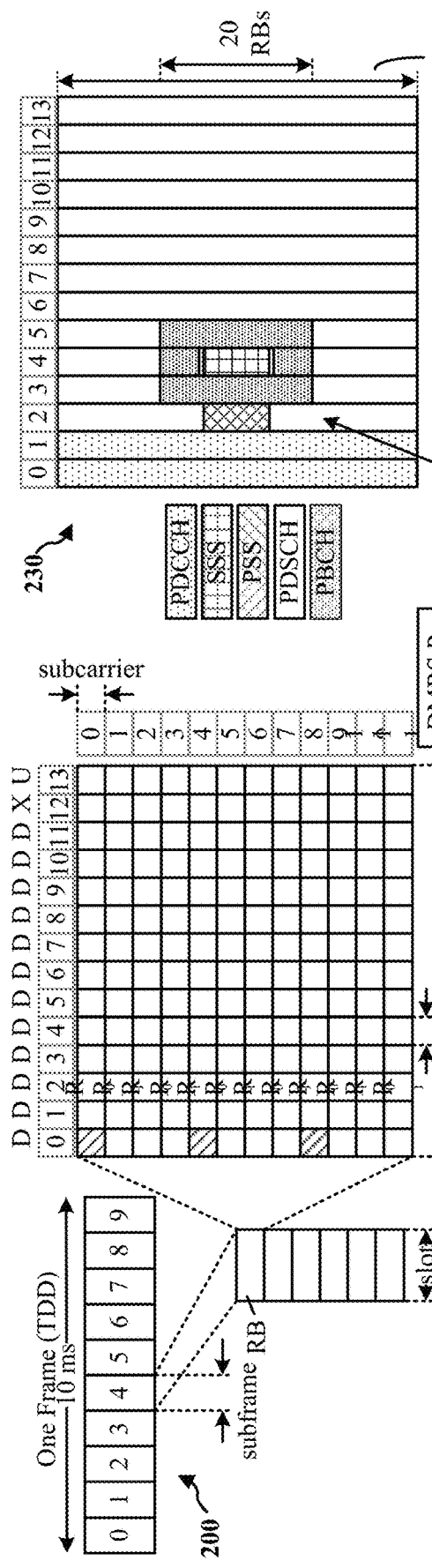
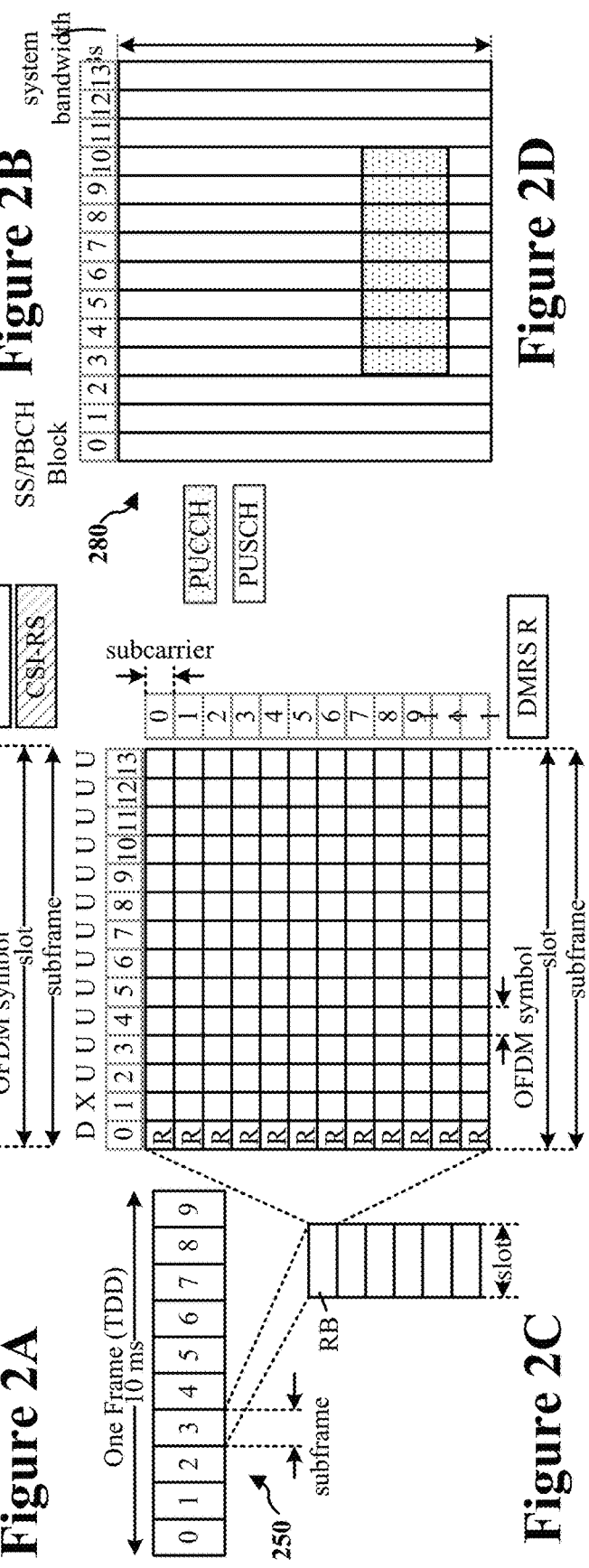
Figure 2A  Figure 2B  Figure 2C  Figure 2D

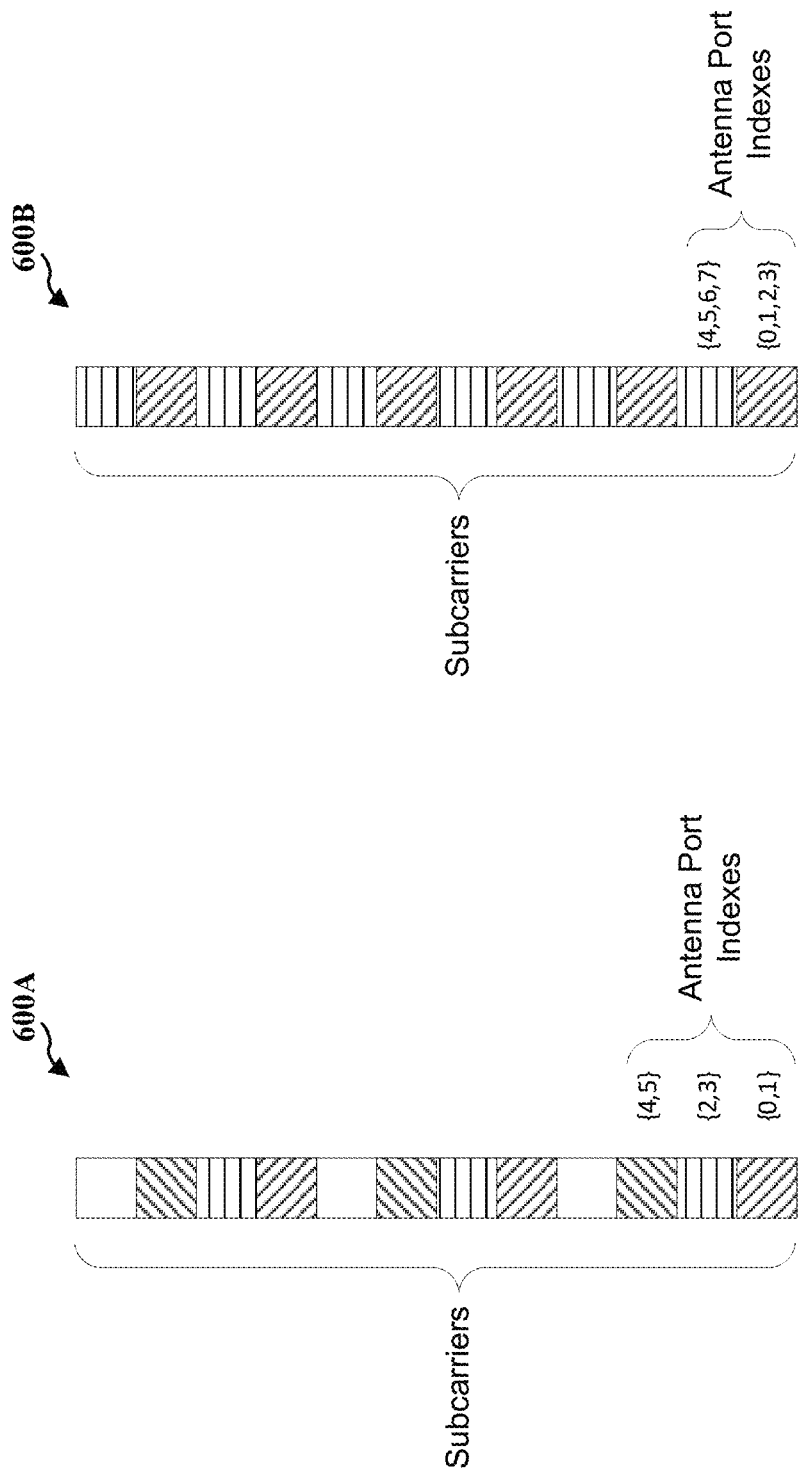

1110

Changing an active bandwidth part (BWP) associated with the wireless communication device. (1112)

↓

Reporting a different number of RX antenna ports or TX chains based on the change in the active BWP. (1114)

Changing a power saving configuration of the wireless communication device. (1122)

↓

Reporting a different number of RX antenna ports or TX chains based on the change in the power saving configuration. (1124)

Figure 11C

SRS ANTENNA SWITCHING FOR MULTIPLE RECEIVE ANTENNAS

CROSS-REFERENCE TO RELATED APPLICATIONS

This application is a continuation of U.S. patent application Ser. No. 17/066,115, filed Oct. 8, 2020, which claims priority to Greek Patent Application No. 20190100448 entitled "SRS ANTENNA SWITCHING FOR MULTIPLE RECEIVE ANTENNAS" filed on Oct. 9, 2019 and to Greek Patent Application No. 20200100013 entitled "SRS ANTENNA SWITCHING FOR MULTIPLE RECEIVE ANTENNAS" field on Jan. 15, 2020, all of which are assigned to the assignee hereof. The disclosures of all prior Applications are considered part of and incorporated by reference in this Patent Application.

TECHNICAL FIELD

This disclosure relates generally to wireless communication and, more specifically, to channel sounding techniques for antenna switching between multiple receive antennas.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology Some wireless devices may have multiple receive (RX) antenna ports. Each RX antenna port may correspond to a different communication channel. Thus, the channel conditions for one RX antenna port may be different than the channel conditions for another RX antenna port. A wireless device may be configured to transmit sounding reference signal (SRS) resources on each of its RX antenna ports to measure the channel conditions associated therewith. The number of SRS resources needed to sound each of the RX antenna ports may depend on the number of RX antenna ports of the wireless device. Existing 3GPP standards (such as LTE Rel-15 and NR Rel-15) provide SRS configurations for devices having up to 4 RX antenna ports. However, modern wireless devices may have more than 4 RX antenna ports. For example, some wireless devices may have up to 8 RX antenna ports.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a wireless communication device, and may include determining an antenna switching capability of a user equipment (UE), where the antenna switching capability represents a number of receive (RX) antenna ports of the UE; scheduling a number of sounding reference signal (SRS) resource sets for the UE based on the number of RX antenna ports in excess of four; and receiving, from the UE, uplink (UL) transmissions of one or more SRS resources for each of the scheduled SRS resource sets. In some implementations, the number of RX antenna ports of the UE may be equal to 6 or 8. In some implementations, each of the SRS resources may include more than 4 ports.

In some implementations, the determining of the antenna switching capability my include determining a number of transmit (TX) chains of the UE switchably coupled to two or more of the RX antenna ports, where the number of SRS resource sets scheduled for the UE is based on the number of TX chains and the number of RX antenna ports in excess of four. In some implementations, each of the SRS resource sets may include the last 6 symbols of a respective UL slot and may include up to 2 SRS resources. In some aspects, the number of TX chains may be determined to be equal to 1 and the number of SRS resource sets scheduled for the UE may be greater than 2. In some other aspects, the number of TX chains may be determined to be greater than 1 and the number of SRS resource sets scheduled for the UE may be greater than or equal to 1.

In some other implementations, each of the SRS resource sets may include the last 6 symbols of a respective UL slot and may include up to 3 SRS resources. In some aspects, the number of TX chains may be determined to be equal to 1 and the number of SRS resource sets scheduled for the UE may be greater than 2. In some other aspects, the number of TX chains may be determined to be greater than 1 and the number of SRS resource sets scheduled for the UE may be greater than or equal to 1.

In some other implementations, each of the SRS resource sets may include up to 14 symbols of a respective UL slot and may include up to 6 SRS resources. In such implementations, the method may further include dynamically configuring the number of SRS resources in each of the SRS resource sets based on changes in UL traffic from the UE.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to determine an antenna switching capability of a UE, where the antenna switching capability represents a number of RX antenna ports of the UE; schedule a number of SRS resource sets for the UE based on the number of RX antenna ports in excess of four; and receive, from the UE, UL transmissions of one or more SRS resources for each of the scheduled SRS resource sets.

Another innovative aspect of the subject matter described in this disclosure can be implemented in a method for wireless communication. The method may be performed by a wireless communication device, and may include reporting, to a network node, an antenna switching capability indicating at least a number of RX antenna ports greater than four; receiving a schedule for a number of SRS resource sets based on the reported antenna switching capability; and transmitting, to the network node, one or more SRS resources for each of the scheduled SRS resource sets.

In some implementations, the antenna switching capability may further indicate a number of TX chains switchably coupled to two or more of the RX antenna ports, where the number of TX chains is greater than 4 and the one or more SRS resources are transmitted over a plurality of resource elements (REs). In such implementations, the method may further include calculating a number of cyclic shifts to be applied to the transmission of the one or more SRS resources on each of the RX antenna ports. In some implementations, the number of cyclic shifts for each RE of the plurality of REs may be less than or equal to the number of RX antenna ports.

In some implementations, the cyclic shift ($\alpha_i$) for each RX antenna port ($p_i$) is calculated based on a first value ($N_{ap}^{SRS}$), a number of cyclic shifts ($n_{SRS}^{cs}$) defined by a first parameter, and a maximum number of cyclic shifts ($n_{SRS}^{cs,max}$), where $$\alpha_i = 2\pi \frac{n_{SRS}^{cs,i}}{n_{SRS}^{cs,max}}, n_{SRS}^{cs,i} = \left( n_{SRS}^{cs} + \frac{n_{SRS}^{cs,max}(p_i - 1000)}{N_{ap}^{SRS}} \right) \mod n_{SRS}^{cs,max}$$

In some implementations, the method may further include determining the first value $N_{ap}^{SRS}$ to be equal to 6 or 8 based on the number of RX antenna ports being equal to 6 or 8, respectively. In some other implementations, the method may further include determining the first value $N_{ap}^{SRS}$ to be equal to 2 or 4 based on the number of RX antenna ports being equal to 6 or 8, respectively. In some implementations, the method may further include changing an active bandwidth part (BWP) associated with the wireless communication device and reporting a different number of RX antenna ports or TX chains based on the change in the active BWP. In some other implementations, the method may further include changing a power saving configuration of the wireless communication device and reporting a different number of RX antenna ports or TX chains based on the change in the power saving configuration.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to report, to a network node, an antenna switching capability indicating at least a number of RX antenna ports greater than four; receive a schedule for a number of SRS resource sets based on the reported antenna switching capability; and transmit, to the network node, one or more SRS resources for each of the scheduled SRS resource sets.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

FIG. 6A shows an example symbol configuration for SRS sounding according to some implementations.

FIG. 6B shows another example symbol configuration for SRS sounding according to some implementations.

FIG. 11B shows a flowchart illustrating an example process for wireless communication that supports scheduling SRS resource sets for devices with multiple RX antennas according to some other implementations.

FIG. 11C shows a flowchart illustrating an example process for wireless communication that supports scheduling SRS resource sets for devices with multiple RX antennas according to some other implementations.

DETAILED DESCRIPTION

Figure 1:
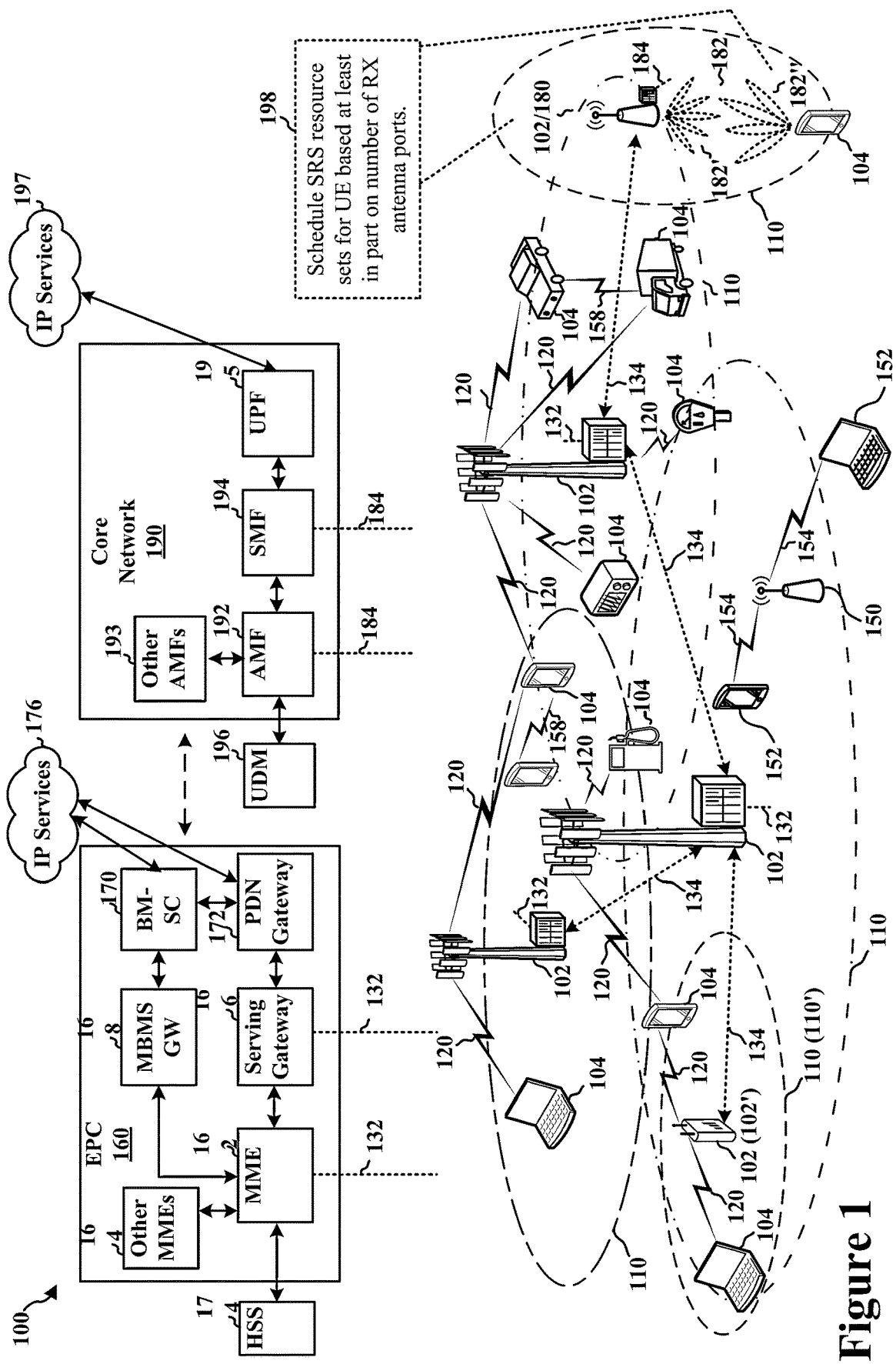
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IoT) network.

Some wireless devices may have multiple receive (RX) antenna ports. Each RX antenna port may correspond to a different communication channel. Thus, the channel conditions for one RX antenna port may be different than the channel conditions for another RX antenna port. A wireless device may be configured to transmit sounding reference signal (SRS) resources on each of its RX antenna ports to measure the channel conditions associated therewith. The number of SRS resources needed to sound each of the RX antenna ports may depend on the number of RX antenna ports of the wireless device. Existing 3GPP standards (such as LTE Rel-15 and NR Rel-15) provide SRS configurations for devices having up to 4 RX antennas. However, modern wireless devices may have more than 4 RX antennas. For example, some wireless devices may have up to 8 RX antennas.

Various implementations relate generally to channel sounding for wireless communications. Some implementations more specifically relate to scheduling SRS resource sets for devices with multiple RX antennas. A device, such as a user equipment (UE), may be configured to provide SRS resources with uplink (UL) transmissions to another device, such as a network node or base station (BS). The base station uses the received SRS resources to determine channel information associated with each of the UE's RX antennas. For example, the base station may determine a channel quality indicator (CQI), rank indicator (RI), or precoding matrix indicator (PMI) based on the received SRS resources. The base station may then schedule or allocate UL and downlink (DL) resources (such as through channel reciprocity) for the UE based on the measured channel information.

In some implementations, a base station may schedule a number of SRS resource sets for a particular UE based, at least in part, on the number of RX antenna ports of the UE, and in some particular implementations, the number of RX antenna ports in excess of four. The scheduling may be performed using a radio resource control (RRC) protocol. Each SRS resource set is provided in a different UL slot and includes one or more SRS resources. In some other implementations, each of the SRS resource sets may comprise 14 symbols of its respective UL slot and include up to 6 SRS resources. In some instances where an SRS resource set comprises 14 symbols of its respective UL slot, the number of SRS resources may be the same in each of the SRS resource sets. In some other instances where an SRS resource set comprises 14 symbols of its respective UL slot, the number of SRS resources in each of the SRS resource sets may be dynamically configured based at least in part on changes in UL traffic patterns from the UE. As a result, the number of SRS resources in one of the SRS resource sets may be different than the number of SRS resources in another of the SRS resource sets.

In some implementations, the scheduling of SRS resource sets for a particular UE may further depend, at least in part, on the number of transmit (TX) chains of the UE with antenna switching capabilities. For example, the RX antennas may outnumber the TX chains (and power amplifiers) in a particular UE. In such cases, one or more of the TX chains may be configured such that it may be selectively switched ("switchably coupled") to multiple RX antennas. In some implementations, each of the SRS resource sets may comprise the last 6 symbols of its respective UL slot and include 2 SRS resources (or up to 3 SRS resources under certain UL or DL traffic conditions). In some instances where an SRS resource set comprises the last 6 symbols of its respective UL slot, the number of TX chains with antenna switching capabilities may be equal to 1 and the number of SRS resource sets may be greater than 2. In some other instances where an SRS resource set comprises the last 6 symbols of its respective UL slot, the number of TX chains with antenna switching capabilities may be greater than 1 and the number of SRS resources may also be greater than or equal to 1.

In some implementations, a UE may dynamically report its antenna switching capabilities to the base station. The reporting may be performed using RRC signaling. In some implementations, the number of RX antenna ports or the number of TX chains reported to the base station may be based, at least in part, on an active bandwidth part (BWP). For example, the UE may report a different number of RX antenna ports or TX chains to the base station when the active BWP changes. In some other implementations, the number of RX antenna ports or the number of TX chains reported to the base station may be based at least in part on a power saving configuration. For example, the UE may report a different number of RX antenna ports or TX chains in response to changes in the power saving configuration. The reported antenna switching capabilities may affect the scheduling of SRS resource sets by the base station.

Particular implementations of the subject matter described in this disclosure can be implemented to realize one or more of the following potential advantages. By scheduling SRS resources to be transmitted across more than 4 antennas, aspects of the present disclosure may provide greater flexibility in the allocation of UL and DL resources, which may lead to improvements in the speed or throughput of communications. Among other advantages, allowing channel quality measurements for up to 8 RX antenna ports may enable DL beamforming to be performed in one or more time-division duplexing (TDD) frequency bands (based on channel reciprocity). By limiting the allocation of SRS resource sets to the last 6 symbols of a respective UL slot, some aspects may provide enhancements to legacy devices operating in accordance with existing 3GPP standards (such as LTE Rel-15 or NR Rel-15). Further, by extending the SRS resource set to all 14 symbols of a respective UL slot, other aspects may offer greater flexibility and efficiency in the scheduling of SRS resources for devices having more than 4 RX antennas.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may be configured to schedule sounding reference signal (SRS) resource sets for a particular UE 104 based, at least in part, on an antenna switching capability of the UE 104 (198). The antenna switching capability may include at least a number of receive (RX) antenna ports of the UE 104 or a number of transmit (TX) chains of the UE 104 switchably coupled to two or more of the RX antenna ports. In some implementations, the number of SRS resource sets may be based at least in part on the number of RX antenna ports of the UE 104 in excess of four.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible).In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
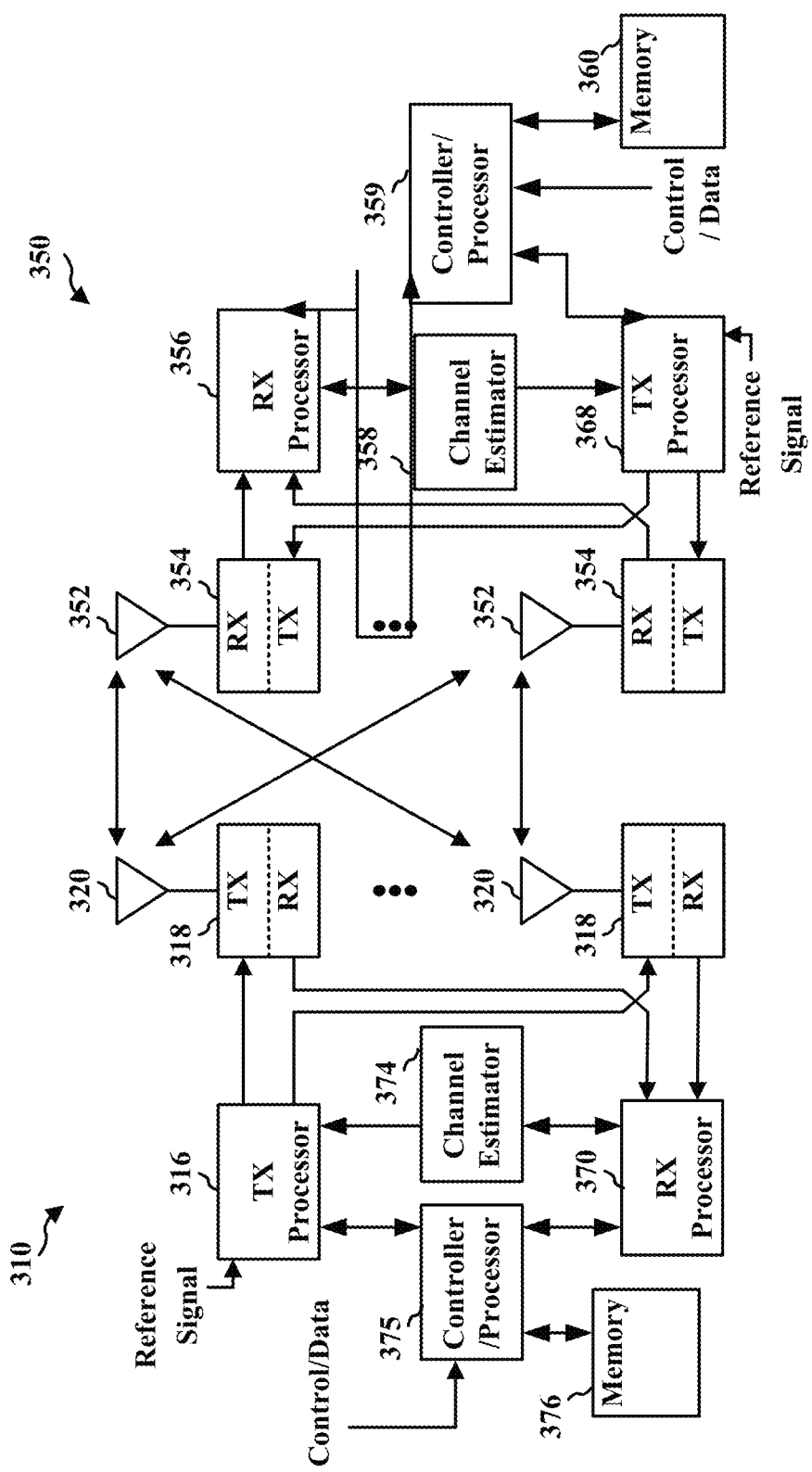
FIG. 3 shows a block diagram of an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Each RX antenna port of a particular UE may correspond to a different communication channel. Thus, the channel conditions for one RX antenna port may be different than the channel conditions for another RX antenna port. As described above, SRS resources may be used by a base station to estimate the channel quality associated with the UE's various RX antenna ports. More specifically, SRS resources may be transmitted by the UE on each of its RX antenna ports. The number of SRS resources needed to sound each of the RX antenna ports may depend on the number of TX chains and RX antenna ports of the UE. For example, a UE with 1 TX chain and 4 RX antenna ports (1T4R) may require 4 SRS resources to sound all 4 RX antenna ports (with each SRS resource having a single port and each SRS port being associated with a different RX antenna port). On the other hand, a UE with 2 TX chains and 4 RX antenna ports (2T4R) may require only 2 SRS resources to sound all 4 antenna ports (with each SRS resource having two ports and each SRS port being associated with a different RX antenna port).

Each SRS resource may be transmitted in a respective UL slot. The SRS resources belonging to the same UL slot are referred to collectively as an SRS resource set. The number of SRS resources that can be transmitted in the same UL slot may depend on a number of factors including, but not limited to, a switching time between transmission of UL data and SRS resources, a switching time between antenna ports, a switching time between UL and DL transmissions, and any limitations or requirements of 3GPP or other standards. For example, existing 3GPP standards (such as LTE Rel-15 and NR Rel-15) provide SRS configurations for UEs having up to 4 RX antennas (1T2R, 1T4R, 2T4R, and T=R). However, modern UEs may have more than 4 RX antennas. Aspects of the present disclosure may improve upon existing channel sounding techniques by enabling a base station to schedule SRS resources for more than 4 RX antennas.

In some implementations, a base station may schedule a number of SRS resource sets for a particular UE based, at least in part, on the number of RX antenna ports of the UE, and in some particular implementations, the number of RX antenna ports in excess of four. The scheduling may be performed using RRC signaling. Each SRS resource set is provided in a different UL slot and includes one or more SRS resources. In some other implementations, each of the SRS resource sets may comprise 14 symbols of its respective UL slot and include up to 6 SRS resources. In some instances where an SRS resource set comprises 14 symbols of its respective UL slot, the number of SRS resources may be the same in each of the SRS resource sets. In some other instances where an SRS resource set comprise 14 symbols of its respective UL slot, the number of SRS resources in each of the SRS resource sets may be dynamically configured based at least in part on changes in UL traffic patterns from the UE. As a result, the number of SRS resources in one of the SRS resource sets may be different than the number of SRS resources in another of the SRS resource sets.

In some implementations, the scheduling of SRS resource sets for a particular UE may further depend, at least in part, on the number of TX chains of the UE with antenna switching capabilities. For example, the RX antennas may outnumber the TX chains (and power amplifiers) in a particular UE. In such cases, one or more of the TX chains may be switchably coupled to multiple RX antennas. In some implementations, each of the SRS resource sets may comprise the last 6 symbols of its respective UL slot and include up to 2 SRS resources. In some instances where an SRS resource set comprises the last 6 symbols of its respective UL slot, the number of TX chains with antenna switching capabilities may be equal to 1 and the number of SRS resource sets may be greater than 2. In some other instances where an SRS resource set comprises the last 6 symbols of its respective UL slot, the number of TX chains with antenna switching capabilities may be greater than 1 and the number of SRS resources may also be greater than or equal to 1.

In some implementations, a UE may dynamically report its antenna switching capabilities to the base station. The reporting may be performed using RRC signaling. In some implementations, the number of RX antenna ports or the number of TX chains reported to the first device may be based, at least in part, on an active BWP. For example, the UE may report a different number of RX antenna ports or TX chains to the base station when the active BWP changes. In some other implementations, the number of RX antenna ports or the number of TX chains reported to the first device may be based at least in part on a power saving configuration. For example, the UE may report a different number of RX antenna ports or TX chains in response to changes in the power saving configuration. The reported antenna switching capabilities may affect the scheduling of SRS resource sets by the base station. For example, a UE reporting 4 TX chains with switching capabilities may be configured to transmit SRS resources having 1, 2, or 4 ports. On the other hand, a UE reporting more than 4 TX chains with switching capabilities may be configured to transmit SRS resources having more than 4 ports.

Particular implementations of the subject matter described in this disclosure can be implemented to realize one or more of the following potential advantages. By scheduling SRS resources to be transmitted across more than 4 antennas, aspects of the present disclosure may provide greater flexibility in the allocation of UL and DL resources which may lead to improvements in speed or throughput of communications. Among other advantages, allowing channel quality measurements for up to 8 RX antenna ports may enable DL beamforming to be performed in one or more time-division duplexing (TDD) frequency bands (based on channel reciprocity). By limiting the allocation of SRS resource sets to the last 6 symbols of a respective UL slot, some aspects may provide enhancements to legacy devices operating in accordance with existing 3GPP standards (such as LTE Rel-15 or NR Rel-15). Further, by extending the SRS resource set to all 14 symbols of a respective UL slot, other aspects may offer greater flexibility and efficiency in the scheduling of SRS resources for devices having more than 4 RX antennas.

Figure 4A:
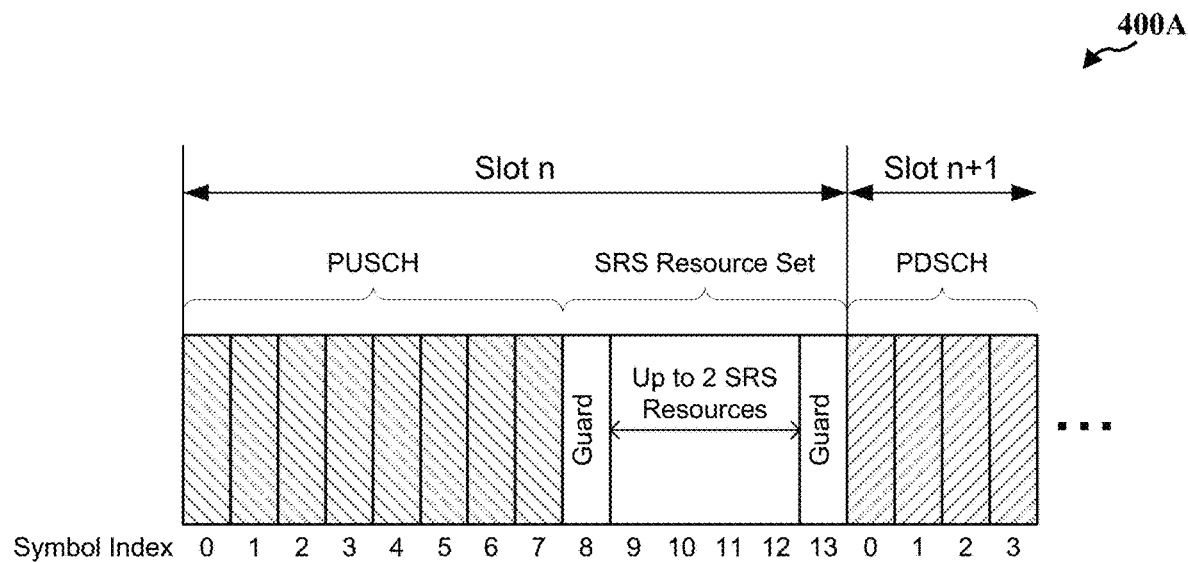
FIG. 4A shows an example slot configuration usable for communications between a base station and a UE according to some implementations.

FIG. 4A shows an example slot configuration 400A usable for communications between a base station and a UE according to some implementations. In some aspects, the slot configuration 400A may be an example implementation of any of the slot configurations described above with respect to FIGS. 2A-2D. More specifically, FIG. 4A depicts a UL slot (n) and a DL slot (n+1). The UL slot n comprises 14 symbols (0-13). In the example of FIG. 4A, at least the first 8 symbols (0-7) are allocated for UL data transmissions on the PUSCH and, at most, the last 6 symbols (8-13) may be used for UL channel sounding. Thus, in the example shown, an SRS resource set is limited to the last 6 symbols of the UL slot n.

A guard period is inserted between individual SRS resources (not shown for simplicity) to allow time for the TX chains of the UE to switch between different RX antenna ports. In some implementations, a guard period may be provided at the beginning of the SRS resource set (such as symbol 8) to allow time for the UE to switch from transmitting UL data to SRS resources. In some other implementations, a guard period is provided at the end of the SRS resource set (such as symbol 13) to allow time the UE to switch communications between adjacent slots (such as from UL traffic to DL traffic). As a result, an SRS resource set based on the slot configuration 400A may include, at most, two SRS resources (in any of the symbols 9-12).

Figure 4B:
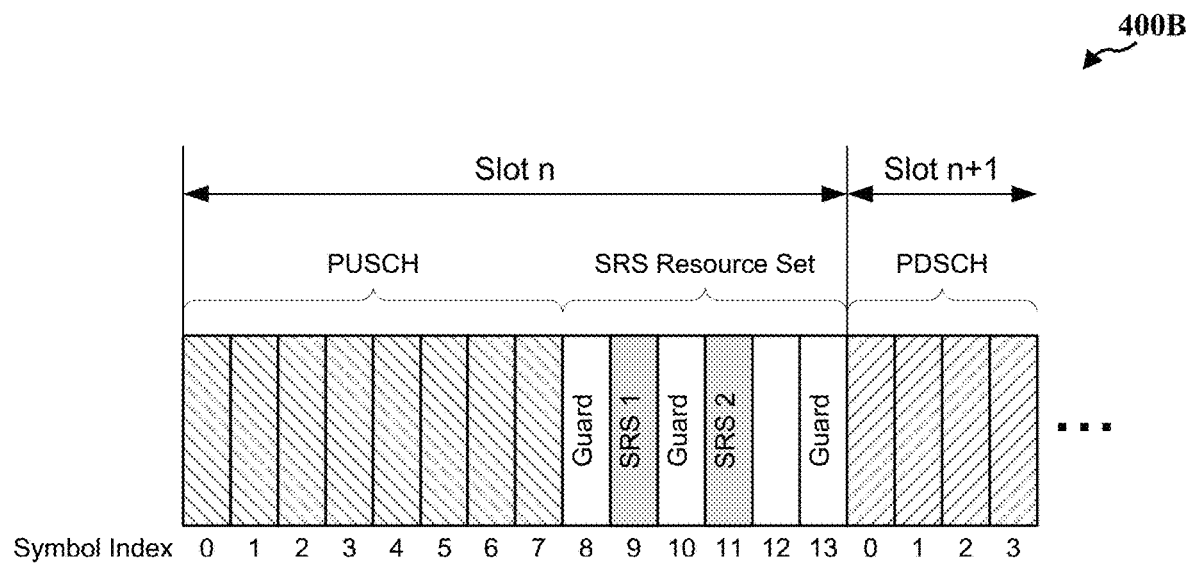
FIG. 4B shows an example sounding reference signal (SRS) resource set configuration based on the slot configuration of FIG. 4A.

As shown in the example SRS resource set configuration 400B of FIG. 4B, a first SRS resource (SRS 1) may be provided in symbol 9, a second SRS resource (SRS 2) may be provided in symbol 11, and a guard period is inserted (in symbol 10) between the two SRS resources. In the example of FIG. 4B, symbol 12 is left empty (for example, as a guard period) since it is adjacent to the second SRS resource and therefore cannot contain another SRS resource. FIG. 4B shows one of many possible configurations of an SRS resource set based on the slot configuration 400A of FIG. 4A. For example, in some configurations the SRS resources may be provided in symbols 10 and 12. In some other configurations, the SRS resource set may include only 1 SRS resource. Still further, in some other configurations, the SRS resource set may comprise fewer than 6 symbols. Under certain conditions (such as when no guard period is needed at the beginning of the SRS resource set or when no guard period is needed at the end of the SRS resource set), the number of SRS resources included in the SRS resource set may be extended up to 3.

Aspects of the present disclosure recognize that the example slot configuration 400A of FIG. 4A is defined by existing 3GPP standards (such as LTE Rel-15 and NR Rel-15). As described above, SRS resource sets that conform to the example slot configuration 400A may include up to 2 SRS resources per set. As a result, the number of SRS resource sets (and UL slots) needed to sound each RX antenna port of a multi-antenna UE may depend, at least in part, on the number of RX antenna ports of the UE and the number of TX chains switchably coupled to the RX antenna ports. For example, a UE having 8 RX antenna ports and a number (x) of TX chains switchably coupled to the RX antenna ports (xT8R) may require 8/x or 4/x SRS resource sets to sound all 8 antenna ports when transmitting 1 or 2 SRS resources, respectively, per SRS resource set. On the other hand, a UE having 6 RX antenna ports presents several unique scenarios for sounding all 6 antenna ports depending on the number (x) of TX chains switchably coupled to the RX antenna ports (xT6R) and the maximum number of SRS resources that can be scheduled in each SRS resource set (1, 2 or 3). Various possible SRS resource set configurations based on the example slot configuration 400A are summarized in Table 1, below.

TABLE 1

| Antenna Switching Capability | #SRS Resources/Set | # SRS Resource Sets |
|---|---|---|
| 1T6R | 1 | 6 |
| (1 SRS port per SRS resource) | 2 | 3 |
|  | 3 | 2 |
| 2T6R | 1 | 3 |
| (2 SRS ports per SRS resource) | 1 or 2 | 2 |
|  | 3 | 1 |
| 4T6R — option 1 | 1 | 3 |
| (4 SRS ports per SRS resource) | 2 | 1 or 2 |

TABLE 1-continued

| Antenna Switching Capability | #SRS Resources/Set | # SRS Resource Sets |
|---|---|---|
|  | 3 | 1 |
| 4T6R — option 2 | 1 | 2 |
| (4 SRS ports per SRS resource) | 2 | 1 |
| 1T8R | 1 | 8 |
| (1 SRS port per SRS resource) | 2 or 3 | 4 |
| 2T8R | 1 | 4 |
| (2 SRS ports per SRS resource) | 2 or 3 | 2 |
| 4T8R | 1 | 2 |
| (4 SRS ports per SRS resource) | 2 or 3 | 1 |

As shown in Table 1, a UE having 6 RX antenna ports may require a different number of SRS resource sets to sound all 6 antenna ports depending on whether each SRS resource set includes 1, 2, or 3 SRS resources. For example, a UE having a 2T6R antenna switching capability may sound 2 RX antenna ports per SRS resource. However, when the number of SRS resources in an SRS resource set is limited to 2, the UE may sound at most 4 RX antennas using the SRS resource set (with 2 SRS resources). Thus, an additional SRS resource set (with only 1 SRS resource) is needed to sound the remaining 2 RX antenna ports. A UE having a 4T6R antenna switching capability can sound up to 4 RX antenna ports per SRS resource, and thus, 2 resources configured in one or two resource sets can be used to sound all 6 RX antennas (shown in Table 1 as "option 1"). In another example, as 2 RX antenna ports cannot be sounded per SRS resource, the 2 RX antennas that are not sounded may be switched at a time. Thus, the un-sounded 2 RX antennas can also cycle through all 6 RX antennas (shown in Table 1 as "option 2"). In this case, all the 6 Rx antennas can be sounded twice.

Figure 5A:
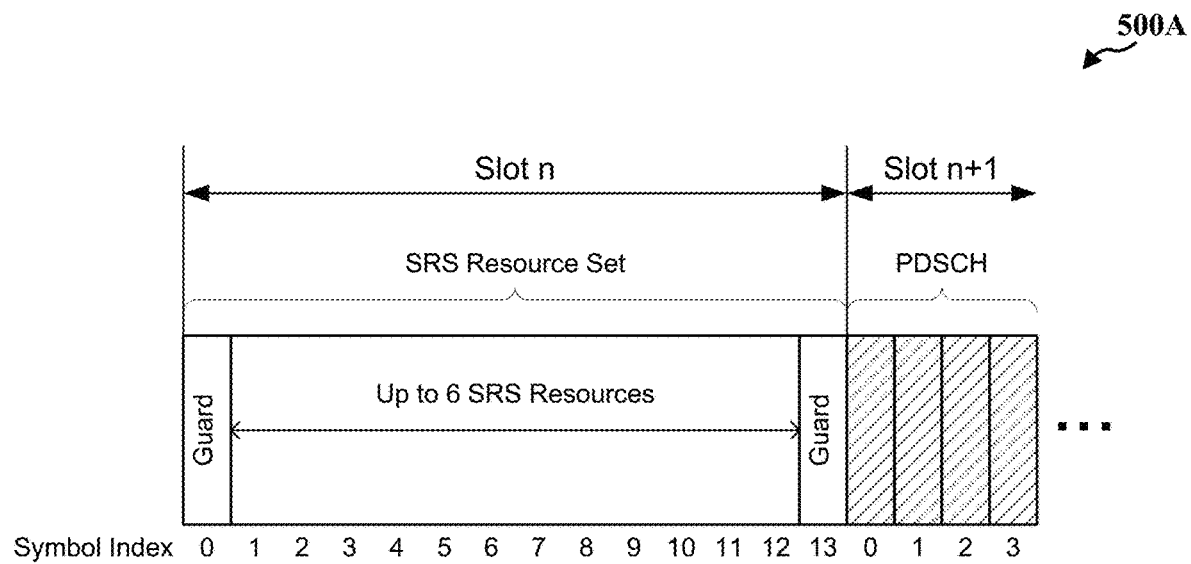
FIG. 5A shows an example slot configuration usable for communications between a base station and a UE according to some implementations.

FIG. 5A shows an example slot configuration 500A usable for communications between a base station and a UE according to some implementations. In some aspects, the slot configuration 500A may be an example implementation of any of the slot configurations described above with respect to FIGS. 2A-2D. More specifically, FIG. 5A depicts a UL slot (n) and a DL slot (n+1). The UL slot n comprises 14 symbols (0-13). In the example of FIG. 5A, all 14 symbols (0-13) may be used for UL channel sounding. Thus, in the example shown, an SRS resource set may comprise any of the 14 symbols of the UL slot n.

A guard period is provided at the beginning of the SRS resource set (such as symbol 0) to allow time for the UE to switch communications between adjacent slots (such as from UL traffic to DL traffic). Another guard period is provided at the end of the SRS resource set (such as symbol 13) also to allow time the UE to switch communications between adjacent slots (such as from UL traffic to DL traffic). In addition, a guard period may be inserted between individual SRS resources (not shown for simplicity) to allow time for the TX chains of the UE to switch between different RX antenna ports. As a result, an SRS resource set based on the slot configuration 500A may include, at most, six SRS resources (in any of the symbols 1-12).

Figure 5B:
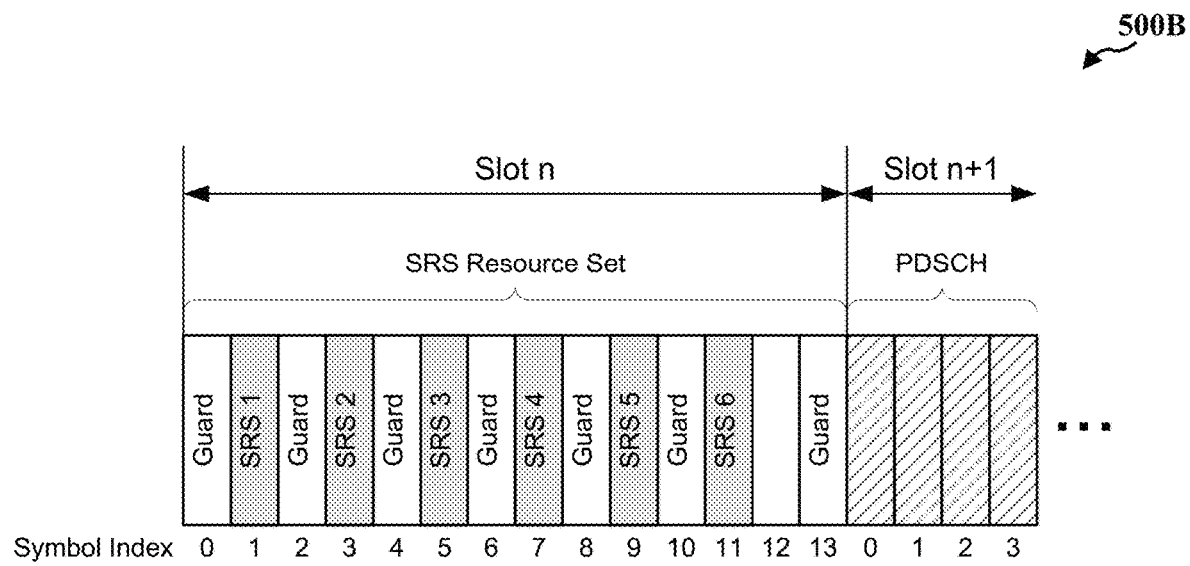
FIG. 5B shows an example SRS resource set configuration based on the slot configuration of FIG. 5A.

As shown in the example SRS resource set configuration 500B of FIG. 5B, 6 SRS resources (SRS 1, SRS 2, SRS 3, SRS 4, SRS 5, and SRS6) are provided in symbols 1, 3, 5, 7, 9, and 11, respectively, and a guard period is inserted (in symbols 2, 4, 6, 8, and 10) between every pair of adjacent SRS resources. In the example of FIG. 5B, symbol 12 is left empty (for example, as a guard period) since it is adjacent to the sixth SRS resource and therefore cannot contain another SRS resource. FIG. 5B shows just one possible configuration of an SRS resource set based on the slot configuration 500A of FIG. 5A. For example, in some configurations the SRS resources may be provided in symbols 2, 4, 6, 8, 10, and 12. In some other configurations, the SRS resource set may include fewer than 6 SRS resources. Still further, in some other configurations, the SRS resource set may comprise fewer than 14 (such as 12 or 8) symbols.

Aspects of the present disclosure recognize that the example slot configuration 500A of FIG. 5A may offer greater flexibility and efficiency in the scheduling of SRS resources than the example slot configuration 400A of FIG. 4A. As described above, SRS resources sets that conform to the example slot configuration 500A may include up to 6 SRS resources per set. As a result, the number of SRS resource sets (and UL slots) needed to sound each RX antenna port of a multi-antenna UE may depend, at least in part, on the number of RX antenna ports of the UE and the number of TX chains switchably coupled to the RX antenna ports. In some implementations, a UE having 8 RX antenna ports and a number (x) of TX chains switchably coupled to the RX antenna ports (xT8R) may require 8/x, 4/x, or 2/x SRS resource sets to sound all 8 antenna ports when transmitting 1, 2, or 4 SRS resources, respectively, per SRS resource set. In some implementations, a UE having 6 RX antenna ports and a number (x) of TX chains switchably coupled to the RX antenna ports (xT6R) may require 6/x, 3/x, or 2/x, or 1/x SRS resource sets to sound all 6 antenna ports when transmitting 1, 2, 3, or 6 SRS resources, respectively, per SRS resource set. As described above, a 4T6R UE may use 2 or 3 SRS resources to sound all 6 RX antennas (depending on whether it is desired to sound each antenna twice).

In some other implementations, the number of SRS resources in each SRS resource set may be dynamically allocated. For example, depending on UL (or DL) traffic or channel conditions, the number of SRS resources provided in one SRS resource set may be different than the number of SRS resources provided in another SRS resource set. However, some UL (or DL) traffic or channel conditions may also warrant the same number of SRS resources to be provided in each SRS resource set. In other words, the number of SRS resources provided in a given SRS resource set may dynamically change in response to changing traffic or channel conditions. For example, given a 1T8R UE configured for 2 SRS resource sets, the number of SRS resources per SRS resource set could be split in any of the following ways: 2/6, 3/5, or 4/4. Similarly, given a 1T6R UE configured for 2 SRS resource sets, the number of SRS resources per SRS resource set could be split in any of the following ways: 1/5, 2/4, or 3/3. Various possible SRS resource set configurations based on the example slot configuration 500A are summarized in Table 2, below.

TABLE 2

| Antenna Switching Capability | #SRS Resources/Set | # SRS Resource Sets |
| --- | --- | --- |
| 1T6R (1 SRS port per SRS resource) | 1 | 6 |
| | 2 | 3 |
| | 3 | 2 |
| | 6 | 1 |
| | Dynamic | 1, 2, 3, 4, 5, or 6 |
| 2T6R (2 SRS ports per SRS resource) | 1 | 3 |
| | 3 | 1 |
| | Dynamic | 1, 2, or 3 |
| 4T6R (4 SRS ports per SRS resource) | 1 | 2 or 3 |
| | 2 or 3 | 1 |
| | Dynamic | 1, 2, or 3 |

TABLE 2-continued

| Antenna Switching Capability | #SRS Resources/Set | # SRS Resource Sets |
| --- | --- | --- |
| 1T8R (1 SRS port per SRS resource) | 1 | 8 |
| | 2 | 4 |
| | 4 | 2 |
| | Dynamic | 2, 3, 4, 5, 6, 7, or 8 |
| 2T8R (2 SRS ports per SRS resource) | 1 | 4 |
| | 2 | 2 |
| | 4 | 1 |
| | Dynamic | 1, 2, 3, or 4 |
| 4T8R (4 SRS ports per SRS resource) | 1 | 2 |
| | 2 | 1 |

Although not shown in Table 1 or Table 2, for simplicity, a UE having 8 RX antenna ports and 8 TX chains (T=R) may sound all 8 RX antenna ports with a single SRS resource (having 8 SRS ports). Similarly, a UE having 6 RX antenna ports and 6 TX chains also may sound all 6 RX antenna ports with a single SRS resource (having 6 SRS ports). In some implementations, the number of SRS ports included in each SRS resource may be expanded (>4) to support UEs having more than 4 TX chains. Some antenna ports may be sounded using the same frequency resources but with different cyclic shifts. The cyclic shift ($\alpha_i$) for each antenna port ($p_i$) is a function of the number of antenna ports ($N_{ap}^{SRS}$), the number of cyclic shifts ($n_{SRS}^{cs}$) defined by a transmission-Comb parameter, and a maximum number of cyclic shifts ($n_{SRS}^{cs,max}$), as shown in Equation 1.

$$\alpha_i = 2\pi \frac{n_{SRS}^{cs,i}}{n_{SRS}^{cs,max}} \text{ where } n_{SRS}^{cs,i} = \left( n_{SRS}^{cs} + \frac{n_{SRS}^{cs,max}(p_i - 1000)}{N_{ap}^{SRS}} \right) \mod n_{SRS}^{cs,max} \quad (1)$$

In some implementations, a 6T6R or 8T8R configuration can be implemented by substituting $N_{ap}^{SRS}=6$ or 8, respectively, in Equation 1. It is noted that, existing 3GPP standards do not support cyclic shifts for $N_{ap}^{SRS}>4$. In other words, Equation 1 is designed for sounding all 4 antenna ports on every resource element (RE) for a UE having only 4 RX antennas. As such, substituting $N_{ap}^{SRS}=6$ or 8, in Equation 1, may create new cyclic shift values that may be too close to other cyclic shift values, resulting in performance degradation. In some other implementations, a 6T6R or 8T8R configuration can be implemented by substituting $N_{ap}^{SRS}=2$ or 4, respectively, in Equation 1. In other words, fewer antenna ports are sounded on each RE, resulting in fewer cyclic shifts, but more REs are used to sound all 6 or 8 antenna ports.

FIG. 6A shows an example symbol configuration 600A for SRS sounding according to some implementations. The symbol configuration 600A may correspond to an SRS resource that may support UEs having 6 RX antenna ports switchably coupled to 6 TX chains (6T6R). As shown in FIG. 6A, only two antenna ports {0, 1}, {2, 3}, or {4, 5} are sounded on each subcarrier (or RE). Thus, at least 3 subcarriers are needed to sound all 6 antenna ports. The cyclic shift values can be generated by substituting $N_{ap}^{SRS}=2$ in Equation 1. Because $N_{ap}^{SRS} \leq 4$, the example symbol configuration 600A does not require new cyclic shift values beyond what is supported by existing 3GPP standards. Accordingly, the example symbol configuration 600A may be used to sound all 6 antenna ports of a 6T6R UE without loss of performance.

FIG. 6B shows another example symbol configuration 600B for SRS sounding according to some implementations.

The symbol configuration 600B may correspond to an SRS resource that may support UEs having 8 RX antenna ports switchably coupled to 8 TX chains (8T8R). As shown in FIG. 6B, only four antenna ports {0, 1, 2, 3} or {4, 5, 6, 7} are sounded on each subcarrier (or RE). Thus, at least 2 subcarriers are needed to sound all 8 antenna ports. The cyclic shift values can be generated by substituting $N_{ap}^{SRS}=4$ in Equation 1. Because $N_{ap}^{SRS} \leq 4$, the example symbol configuration 600B does not require new cyclic shift values beyond what is supported by existing 3GPP standards. Accordingly, the example symbol configuration 600B may be used to sound all 8 antenna ports of an 8T8R UE without loss of performance.

As described above, the scheduling of SRS resources for a particular UE may depend on the antenna switching capabilities of the UE. More specifically, the scheduling of SRS resources may depend on the antenna switching capabilities reported by the UE to the base station. In some implementations, the number of RX antenna ports or TX chains reported to the base station may be different than the actual number of RX antenna ports or TX chains of the UE. For example, some UEs may have multiple TX chains, but not all of the TX chains are capable of antenna switching. In some aspects, a UE may report only the number of TX chains with antenna switching capabilities (or the number of TX chains that are switchably coupled to two or more RX antenna ports). For example, a UE having 6 RX antenna ports and 2 TX chains, where only 1 of the TX chain is switchably coupled to multiple RX antenna ports, may report its antenna switching capability as 1T6R. Similarly, a UE having 8RX antenna ports and 4 TX chains, where only 2 or 4 of the TX chains are switchably coupled to multiple RX antenna ports, may report its antenna switching capability as 2T8R or 4T8R, respectively.

Figure 7:
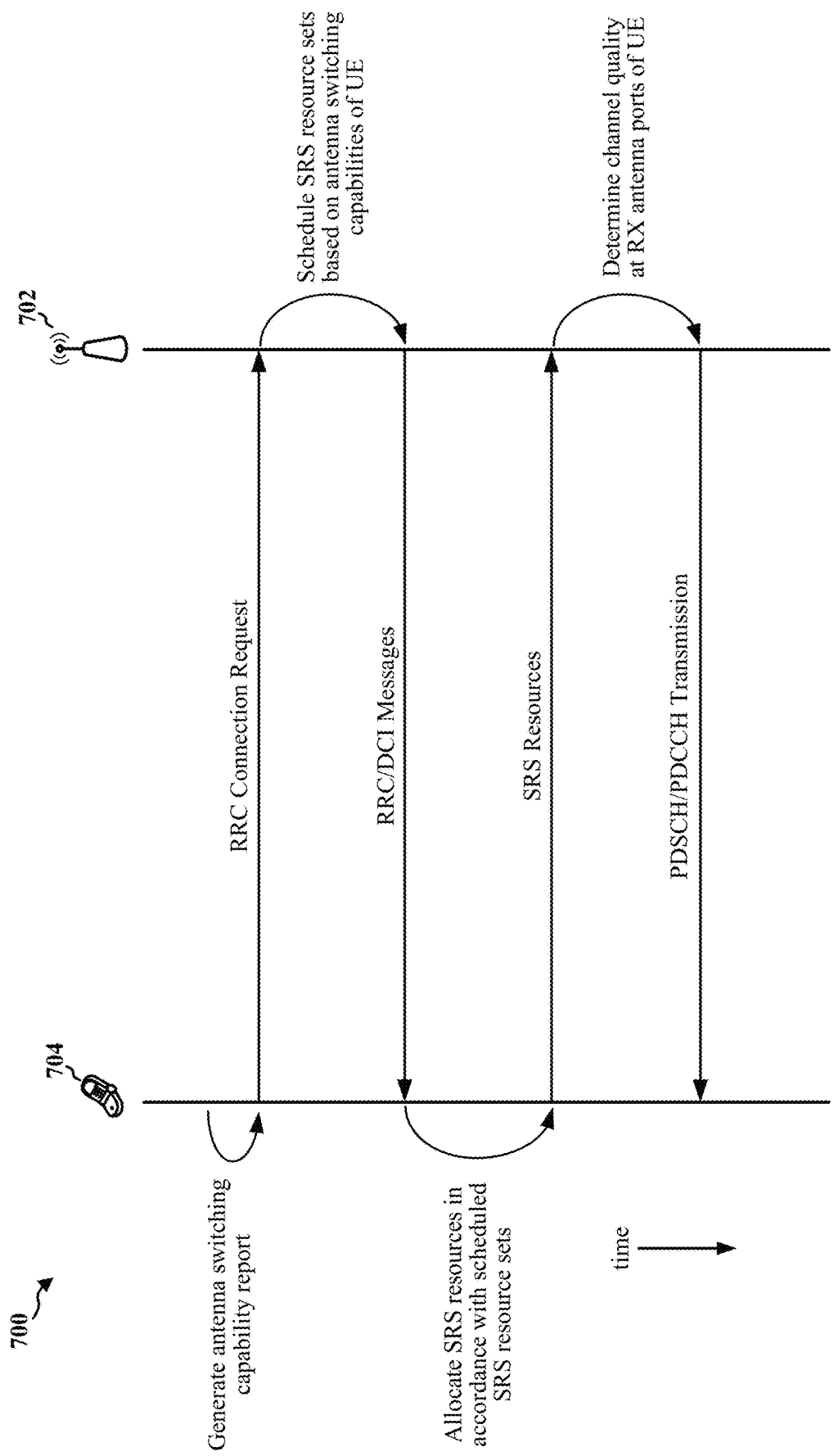
FIG. 7 shows a sequence diagram illustrating an example message exchange between a base station and a UE according to some implementations.

FIG. 7 shows a sequence diagram illustrating an example message exchange 700 between a base station 702 and a UE 704 according to some implementations. In some implementations, the base station 702 may be one example of the base station 102 of FIG. 1, the UE 704 may be one example of the UE 104 of FIG. 1, and the access network may be a 5G NR access network. The base station 702 may be any suitable base station or node including, for example, a gNB or an eNB. Although not shown, for simplicity, the base station 702 may include a multitude of antennas that can be configured to wireless transmit or receive information on a plurality of different beams, for example, to facilitate MIMO communications and beamforming.

The UE 704 may generate an antenna switching capability report and transmit the report to the base station 702 via an RRC connection request. The report may indicate a number of RX antenna ports available for DL communications and a number of TX chains switchably coupled to the RX antenna ports. More specifically, the report may include only the number of TX chains with antenna switching capabilities. In some implementations, the number of RX antenna ports included in the report may be greater than 4. In some other implementations, the number of TX chains included in the report may be greater than 4.

The base station 702 may receive the RRC connection request from the UE 704 and determine the antenna switching capabilities of the UE based on the included report. The base station 702 may then schedule SRS resource sets for the UE 704 based on the determined antenna switching capabilities. In some implementations, the number of SRS resource sets configured for the UE 704 may be based, at least in part, on the number of RX antenna ports of the UE 704 in excess of four. In some aspects, the SRS resource sets may be limited to the last 6 symbols of a UL slot (such as described with respect to FIGS. 4A and 4B). In some other aspects, the SRS resource sets may comprise any of the 14 symbols of a UL slot (such as described with respect to FIGS. 5A and 5B).

The base station 702 may provide the schedule of SRS resource sets to the UE 704 via one or more RRC messages. In addition to providing the schedule of SRS resource sets, the RRC message may facilitate connection establishment and release functions, broadcast of system information, radio bearer establishment, reconfiguration and release operations, RRC connection mobility procedures, paging notification, and power control. The RRC may also configure user and control planes, define multiple downlink semi-persistent scheduling (SPS) configurations, define multiple uplink configured grant (CG) configurations, and control various other functions of the access network.

The base station 702 may also transmit Downlink Control Information (DCI) messages to the UE 704. The DCI messages may contain a number of parameters, configurations, schedules, and/or characteristics of one or more DL channels or beams upon which the base station 702 can transmit DL data and control information to the UE 704. The DCI messages may also activate and release one or more SPS configurations and/or one or more CG configurations. In some implementations, one or more DCI messages may trigger one or more channel sounding operations by the UE 704. For example, the DCI messages may cause the UE 704 to transmit SRS resources in accordance with the scheduled SRS resource sets.

The UE 704 may receive the RRC and DCI messages from the base station 702 and allocate SRS resources to one or more UL slots in accordance with the scheduled SRS resource sets. In some implementations, the UE 704 may transmit up to 2 or 3 SRS resources in each SRS resource set (such as described with respect to FIGS. 4A and 4B). In some other implementations, the UE 704 may transmit up to 6 SRS resource in each SRS resource set (such as described with respect to FIGS. 5A and 5B). Still further, in some implementations, the number of SRS resources provided in each SRS resource set may be dynamically allocated. For example, the number of SRS resources in each of the SRS resource set may depend, at least in part, on UL traffic patterns or channel conditions. As a result, the number of SRS resources may be the same, or different, across multiple SRS resource sets.

The base station 702 may receive the SRS resources from the UE 704 and measure the channel quality associated with each of the UE's antenna ports based on the received SRS resources. The base station 702 may then schedule or allocate UL and DL resources (such as through channel reciprocity) for the UE 704 based on the measured channel quality information. In some implementations, the base station 702 may use the channel quality information to enable DL beamforming to be performed in one or more time-division duplexing (TDD) frequency bands. Thereafter, the base station 702 may initiate DL transmissions to the UE 704 on the PDSCH or PDCCH.

Figure 8:
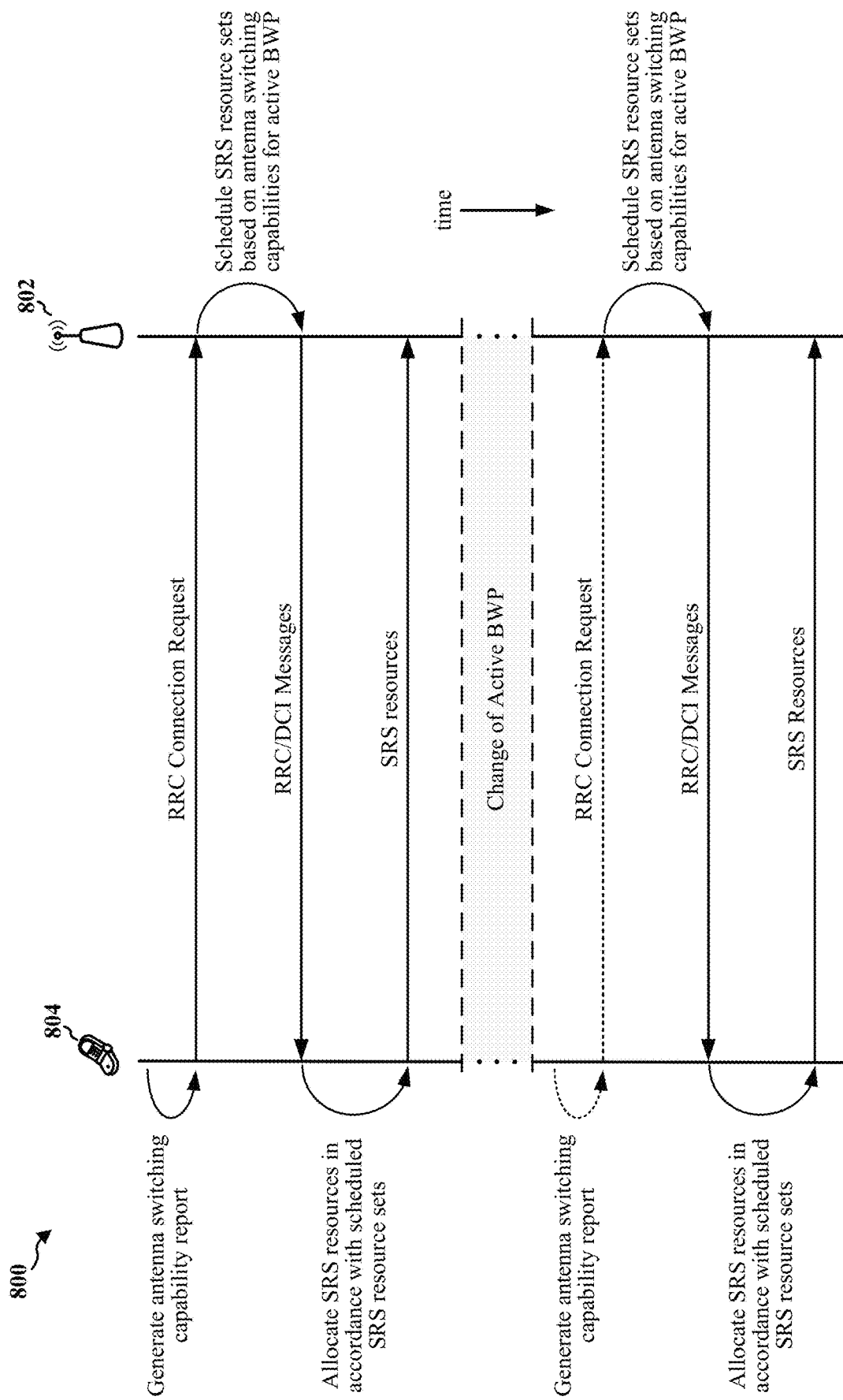
FIG. 8 shows a sequence diagram illustrating another example message exchange between a base station and a UE according to some implementations.

FIG. 8 shows a sequence diagram illustrating another example message exchange 800 between a base station 802 and a UE 804 according to some implementations. In some implementations, the base station 802 may be one example of the base station 102 of FIG. 1, the UE 804 may be one example of the UE 104 of FIG. 1, and the access network may be a 5G NR access network. The base station 802 may be any suitable base station or node including, for example, a gNB or an eNB. Although not shown, for simplicity, the base station 802 may include a multitude of antennas that can be configured to wireless transmit or receive information on a plurality of different beams, for example, to facilitate MIMO communications and beamforming.

The UE 804 may generate an antenna switching capability report and transmit the report to the base station 802 via an RRC connection request. The report may indicate a number of RX antenna ports available for DL communications and a number of TX chains switchably coupled to the RX antenna ports. More specifically, the report may include only the number of TX chains with antenna switching capabilities. In some implementations, the number of RX antenna ports included in the report may be greater than 4. In some other implementations, the number of TX chains included in the report may be greater than 4.

Still further, in some implementations, the antenna switching capability report may indicate a per-BWP antenna switching capability of the UE 804. Bandwidth parts (BWPs) may be formed by multiplexing different signals or signal types for more efficient use of available spectrum or power under different circumstances. For example, the UE 804 may have a different active BWP when located at the center of a cell coverage area than when located at the edge of the cell coverage area. When located at the cell center, the UE 804 may support wideband DL transmissions (such as on 4 or more RX antennas) and may therefore report greater antenna switching capabilities. When located at the cell edge, the UE 804 may support only narrowband DL transmissions (such as on 1 or 2 RX antennas) and may therefore report more limited antenna switching capabilities.

The base station 802 may receive the RRC connection request from the UE 804 and determine the antenna switching capabilities of the UE based on the included report. The base station 802 may then schedule SRS resource sets for the UE 804 based on the determined antenna switching capabilities. In some implementations, the number of SRS resource sets configured for the UE 804 may be based, at least in part, on the number of RX antenna ports of the UE 804 in excess of four. In some aspects, the SRS resource sets may be limited to the last 6 symbols of a UL slot (such as described with respect to FIGS. 4A and 4B). In some other aspects, the SRS resource sets may comprise any of the 14 symbols of a UL slot (such as described with respect to FIGS. 5A and 5B).

The base station 802 may provide the schedule of SRS resource sets to the UE 804 via one or more RRC messages. In addition to providing the schedule of SRS resource sets, the RRC message may facilitate connection establishment and release functions, broadcast of system information, radio bearer establishment, reconfiguration and release operations, RRC connection mobility procedures, paging notification, and power control. The RRC may also configure user and control planes, define multiple downlink SPS configurations, define multiple uplink CG configurations, and control various other functions of the access network.

The base station 802 may also transmit DCI messages to the UE 804. The DCI messages may contain a number of parameters, configurations, schedules, and/or characteristics of one or more DL channels or beams upon which the base station 802 can transmit DL data and control information to the UE 804. The DCI messages may also activate and release one or more SPS configurations and/or one or more CG configurations. In some implementations, one or more DCI messages may trigger one or more channel sounding operations by the UE 804. For example, the DCI messages may cause the UE 804 to transmit SRS resources in accordance with the scheduled SRS resource sets.

The UE 804 may receive the RRC and DCI messages from the base station 802 and allocate SRS resources to one or more UL slots in accordance with the scheduled SRS resource sets. In some implementations, the UE 804 may transmit up to 2 or 3 SRS resources in each SRS resource set (such as described with respect to FIGS. 4A and 4B). In some other implementations, the UE 804 may transmit up to 6 SRS resource in each SRS resource set (such as described with respect to FIGS. 5A and 5B). Still further, in some implementations, the number of SRS resources provided in each SRS resource set may be dynamically allocated. For example, the number of SRS resources in each of the SRS resource set may depend, at least in part, on UL traffic patterns or channel conditions. As a result, the number of SRS resources may be the same, or different, across multiple SRS resource sets.

After some time has passed, the active BWP of the UE 804 may change. As a result, the antenna switching capabilities of the UE 804 may also change. In some implementations, the UE 804 may dynamically generate a new antenna switching capability report based on the change in active BWP. For example, the new report may be provided to the base station 802 via a subsequent RRC connection request. The base station 802 may then reschedule one or more SRS resource sets for the UE 804 based on the updated antenna switching capabilities included in the report. In some other implementations, the base station 802 may dynamically reschedule the SRS resource sets for the UE 804 upon detecting the change in active BWP. In other words, the initial antenna switching capability report may include a mapping of the UE's antenna switching capabilities to multiple BWPs.

The base station 802 may provide the updated schedule of SRS resource sets to the UE 804 via one or more RRC messages. The base station 802 may also trigger one or more channel sounding operations by the UE 804 via one or more DCI messages. The UE 804 may receive the RRC and DCI messages from the base station 802 and reallocate SRS resources to one or more UL slots in accordance with the updated schedule. In some implementations, the number of SRS resource sets in the current schedule may be different than the number of SRS resource sets in the previous schedule. In some other implementations, the number of SRS resources transmitted per SRS resource set may be different in the current schedule than the number of SRS resources transmitted per SRS resource set in the previous schedule.

Figure 9:
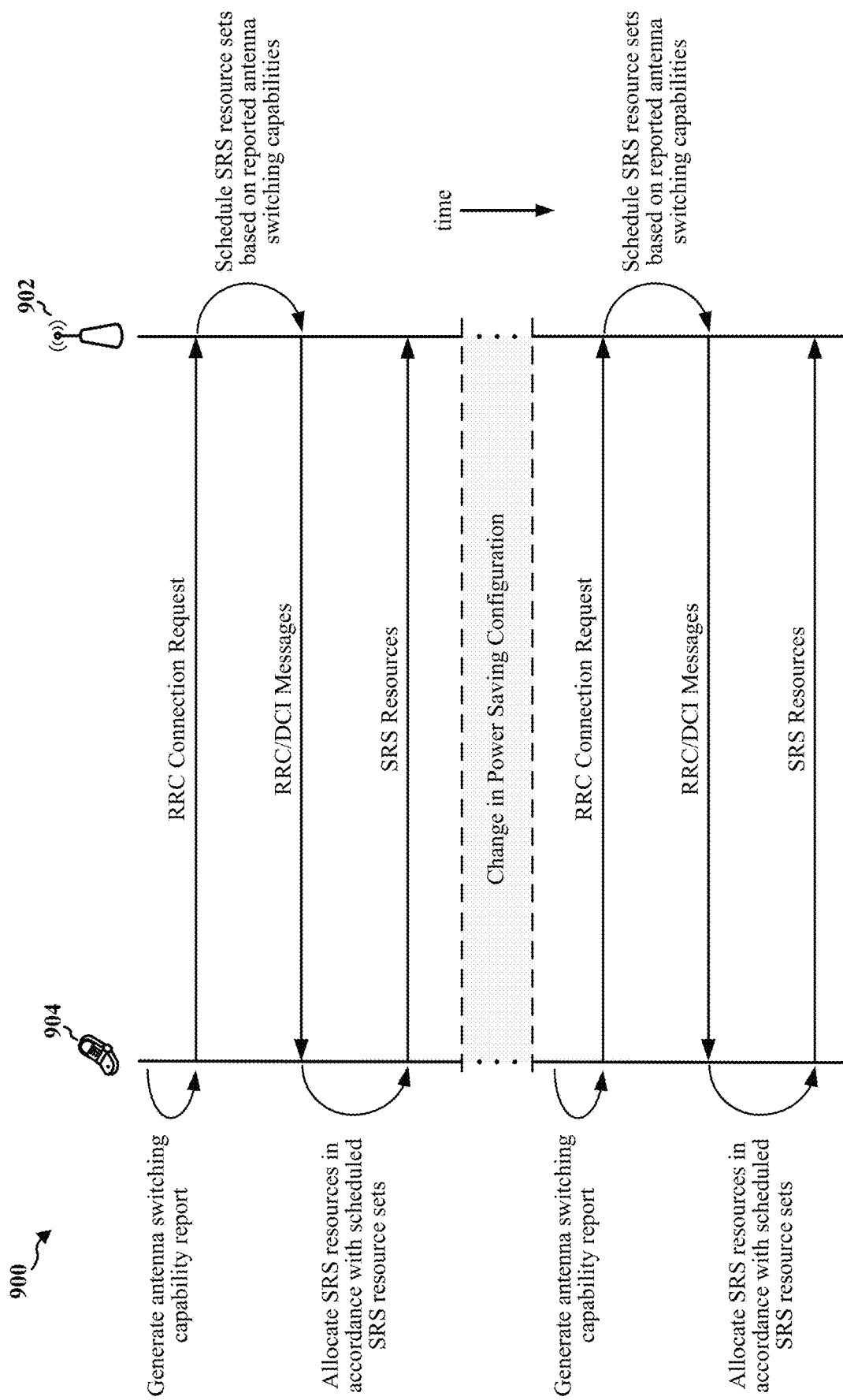
FIG. 9 shows a sequence diagram illustrating another example message exchange between a base station and a UE according to some implementations.

FIG. 9 shows a sequence diagram illustrating another example message exchange 900 between a base station 902 and a UE 904 according to some implementations. In some implementations, the base station 902 may be one example of the base station 102 of FIG. 1, the UE 904 may be one example of the UE 104 of FIG. 1, and the access network may be a 5G NR access network. The base station 902 may be any suitable base station or node including, for example, a gNB or an eNB. Although not shown, for simplicity, the base station 902 may include a multitude of antennas that can be configured to wireless transmit or receive information on a plurality of different beams, for example, to facilitate MIMO communications and beamforming.

The UE 904 may generate an antenna switching capability report and transmit the report to the base station 902 via an RRC connection request. The report may indicate a number of RX antenna ports available for DL communications and a number of TX chains switchably coupled to the RX antenna ports. More specifically, the report may include only the number of TX chains with antenna switching capabilities. In some implementations, the number of RX antenna ports included in the report may be greater than 4. In some other implementations, the number of TX chains included in the report may be greater than 4.

Still further, in some implementations, the antenna switching capability report may be based, at least in part, on a power saving configuration of the UE 904. Aspects of the present disclosure recognize that having more active RX channels may draw a greater amount of power when receiving DL transmissions from the base station 902. Thus, it may be desirable to dynamically change the number of active RX channels when switching between a low-power state and a full-power state. When operating at full power, the UE 904 may attempt to maximize its DL transmissions and may therefore report greater antenna switching capabilities (such as 1T8R, 2T8R, or 4T8R). When operating in a low-power mode, the UE 904 may attempt to throttle its DL transmissions and may therefore report more limited antenna switching capabilities (such as 1T2R, 1T4R, or 2T4R).

The base station 902 may receive the RRC connection request from the UE 904 and determine the antenna switching capabilities of the UE based on the included report. The base station 902 may then schedule SRS resource sets for the UE 904 based on the determined antenna switching capabilities. In some implementations, the number of SRS resource sets configured for the UE 904 may be based, at least in part, on the number of RX antenna ports of the UE 904 in excess of four. In some aspects, the SRS resource sets may be limited to the last 6 symbols of a UL slot (such as described with respect to FIGS. 4A and 4B). In some other aspects, the SRS resource sets may comprise any of the 14 symbols of a UL slot (such as described with respect to FIGS. 5A and 5B).

The base station 902 may provide the schedule of SRS resource sets to the UE 904 via one or more RRC messages. In addition to providing the schedule of SRS resource sets, the RRC message may facilitate connection establishment and release functions, broadcast of system information, radio bearer establishment, reconfiguration and release operations, RRC connection mobility procedures, paging notification, and power control. The RRC may also configure user and control planes, define multiple downlink SPS configurations, define multiple uplink CG configurations, and control various other functions of the access network.

The base station 902 may also transmit DCI messages to the UE 904. The DCI messages may contain a number of parameters, configurations, schedules, and/or characteristics of one or more DL channels or beams upon which the base station 902 can transmit DL data and control information to the UE 904. The DCI messages may also activate and release one or more SPS configurations and/or one or more CG configurations. In some implementations, one or more DCI messages may trigger one or more channel sounding operations by the UE 904. For example, the DCI messages may cause the UE 904 to transmit SRS resources in accordance with the scheduled SRS resource sets.

The UE 904 may receive the RRC and DCI messages from the base station 902 and allocate SRS resources to one or more UL slots in accordance with the scheduled SRS resource sets. In some implementations, the UE 904 may transmit up to 2 or 3 SRS resources in each SRS resource set (such as described with respect to FIGS. 4A and 4B). In some other implementations, the UE 904 may transmit up to 6 SRS resource in each SRS resource set (such as described with respect to FIGS. 5A and 5B). Still further, in some implementations, the number of SRS resources provided in each SRS resource set may be dynamically allocated. For example, the number of SRS resources in each of the SRS resource set may depend, at least in part, on UL traffic patterns or channel conditions. As a result, the number of SRS resources may be the same, or different, across multiple SRS resource sets.

After some time has passed, the power saving configuration of the UE 904 may change. For example, the UE 904 may enter a low-power mode (or return to full power). As result, the desired antenna switching capabilities of the UE 904 may also change. In some implementations, the UE 904 may dynamically generate a new antenna switching capability report based on the change in power saving configuration. For example, the new report may be provided to the base station 902 via a subsequent RRC connection request. The base station 902 may then reschedule one or more SRS resource sets for the UE 904 based on the updated antenna switching capabilities included in the report.

The base station 902 may provide the updated schedule of SRS resource sets to the UE 904 via one or more RRC messages. The base station 902 may also trigger one or more channel sounding operations by the UE 904 via one or more DCI messages. The UE 904 may receive the RRC and DCI messages from the base station 902 and reallocate SRS resources to one or more UL slots in accordance with the updated schedule. In some implementations, the number of SRS resource sets in the current schedule may be different than the number of SRS resource sets in the previous schedule. In some other implementations, the number of SRS resources transmitted per SRS resource set may be different in the current schedule than the number of SRS resources transmitted per SRS resource set in the previous schedule.

Figure 10A:
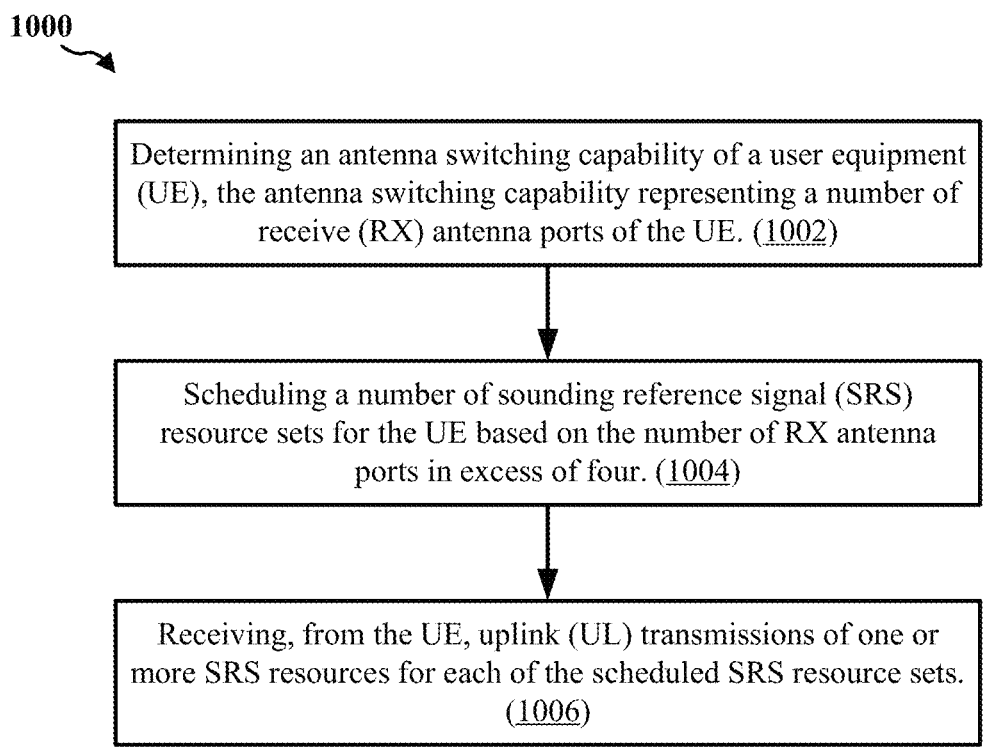
FIG. 10A shows a flowchart illustrating an example process for wireless communication that supports scheduling SRS resource sets for devices with multiple receive (RX) antennas according to some implementations.

FIG. 10A shows a flowchart illustrating an example process 1000 for wireless communication that supports scheduling SRS resource sets for devices with multiple RX antennas according to some implementations. In some implementations, the process 1000 may be performed by a wireless communication device operating as or within a network node, such as one of the base stations 702, 802, or 902 described above with reference to FIGS. 6, 7, and 8, respectively.

In some implementations, the process 1000 begins in block 1002 with determining an antenna switching capability of a UE, the antenna switching capability representing a number of receive (RX) antenna ports of the UE. In block 1004, the process 1000 proceeds with scheduling a number of sounding reference signal (SRS) resource sets for the UE based on the number of RX antenna ports in excess of four. The scheduling may be performed using a radio resource control (RRC) protocol. In some implementations, the number of RX antenna ports of the UE may be equal to 8. In some other implementations, the number of RX antenna ports of the UE may be equal to 6. In block 1006, the process 1000 proceeds with receiving, from the UE, uplink (UL) transmissions of one or more SRS resources for each of the scheduled SRS resource sets. In some implementations, each of the SRS resources may include 1, 2, or 4 ports. In some other implementations, each of the SRS resources may include more than 4 ports.

In some implementations, the antenna switching capability may further indicate a number of transmit (TX) chains of the UE switchably coupled to two or more of the RX antenna ports. Accordingly, the number of SRS resource sets may be based on the number of TX chains and the number of RX antenna ports in excess of four. In some implementations, each of the SRS resource sets may comprise the last 6 symbols of a respective UL slot and include up to 2 SRS resources. In some other implementations, each of the SRS resource sets may comprise the last 6 symbols of a respective UL slot and include up to 3 SRS resources. In some instances where each SRS resource set comprises the last 6 symbols of a UL slot, the number of TX chains may be equal to 1 and the number of SRS resource sets may be greater than 2. In some other instances where each SRS resource set comprises the last 6 symbols of a UL slot, the number of TX chains may be greater than 1 and the number of SRS resource sets may be greater than or equal to 1.

In some other implementations, each of the SRS resource sets may comprise up to 14 symbols of a respective UL slot and include up to 6 SRS resources. In some instances where each SRS resource set comprises up to 14 symbols of a UL slot, the number of SRS resources in each of the SRS resource sets may be dynamically configured based at least in part on changes in UL traffic patterns from the UE. In some other instances where each SRS resource set comprises up to 14 symbols of a UL slot, the number of SRS resources may be the same in each of the SRS resource sets. Still further, in some instances where each SRS resource set comprises up to 14 symbols of a UL slot, the number of SRS resources in one of the SRS resource sets may be different than the number of SRS resources in another of the SRS resource sets.

Figure 10B:
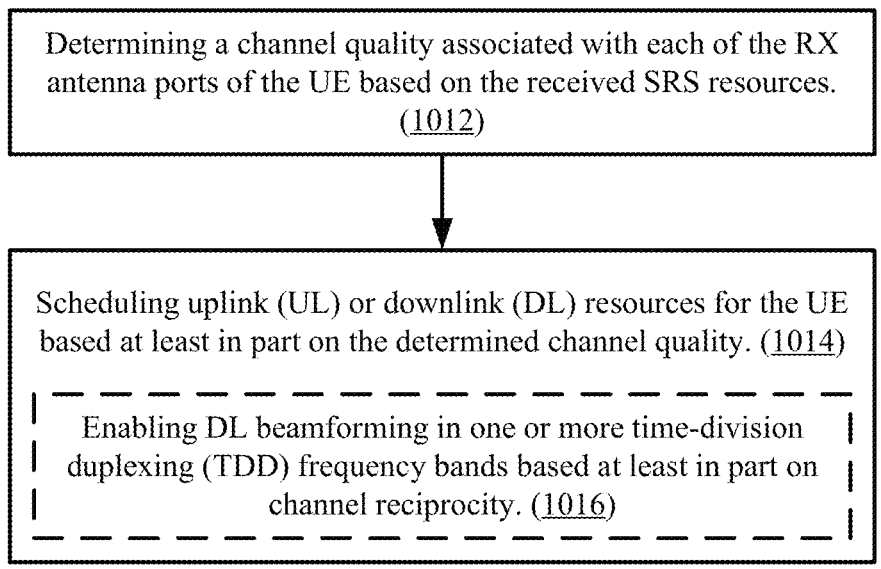
FIG. 10B shows a flowchart illustrating an example process for wireless communication that supports scheduling SRS resource sets for devices with multiple RX antennas according to some implementations.

FIG. 10B shows a flowchart illustrating an example process 1010 for wireless communication that supports scheduling SRS resource sets for devices with multiple RX antennas according to some implementations. In some implementations, the process 1010 may be performed by a wireless communication device operating as or within a network node, such as one of the base stations 702, 802, or 902 described above with reference to FIGS. 6, 7, and 8, respectively.

In some implementations, the process 1010 begins after the process 1000 described with reference to FIG. 10A. For example, the process 1010 may begin, in block 1012, after the reception of the UL transmissions of one or more SRS resources from the UE in block 1006 of the process 1000.

In block 1012, the process 1010 proceeds with determining a channel quality associated with each of the RX antenna ports of the UE based on the received SRS resources. In block 1014, the process 1010 proceeds with scheduling uplink (UL) or downlink (DL) resources for the first device based at least in part on the determined channel quality. In some implementations, the scheduling of UL or DL resources in block 1014 may include enabling DL beamforming in one or more time-division duplexing (TDD) frequency bands based at least in part on channel reciprocity, in block 1016.

Figure 11A:
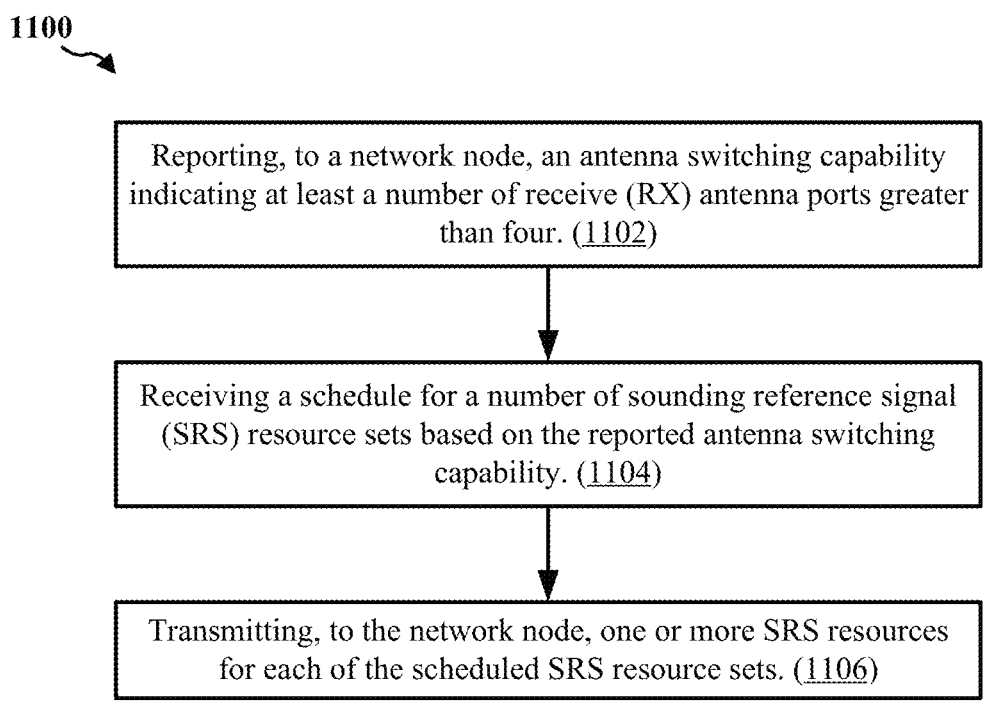
FIG. 11A shows a flowchart illustrating an example process for wireless communication that supports scheduling SRS resource sets for devices with multiple RX antennas according to some other implementations.

FIG. 11A shows a flowchart illustrating an example process 1100 for wireless communication that supports scheduling SRS resource sets for devices with multiple RX antennas according to some other implementations. In some implementations, the process 1100 may be performed by a wireless communication device operating as or within a UE, such as one of the UEs 704, 804, or 904 described above with reference to FIGS. 6, 7, and 8, respectively.

In some implementations, the process 1100 begins in block 1102 with reporting, to a network node, an antenna switching capability indicating at least a number of receive (RX) antenna ports greater than four. In block 1104, the process 1100 proceeds with receiving a schedule for a number of sounding reference signal (SRS) resource sets based on the reported antenna switching capability. The reporting may be performed using a radio resource control (RRC) protocol. In some implementations, the number of RX antenna ports reported may be equal to 8. In some other implementations, the number of RX antenna ports reported may be equal to 6. In block 1106, the process 1100 proceeds with transmitting, to the network node, one or more SRS resources for each of the scheduled SRS resource sets. In some implementations, each of the SRS resources may include 1, 2, or 4 ports. In some other implementations, each of the SRS resources may include more than 4 ports.

In some implementations, the antenna switching capability may further indicate a number of transmit (TX) chains switchably coupled to two or more of the RX antenna ports. Accordingly, the number of SRS resource sets may be based on the number of TX chains and the number of RX antenna ports reported in excess of four. In some implementations, each of the SRS resource sets may comprise the last 6 symbols of a respective UL slot and include up to 2 SRS resources. In some other implementations, each of the SRS resource sets may comprise the last 6 symbols of a respective UL slot and include up to 3 SRS resources. In some instances where each SRS resource set comprises the last 6 symbols of a UL slot, the number of TX chains may be equal to 1 and the number of SRS resource sets may be greater than 2. In some other instances where each SRS resource set comprises the last 6 symbols of a UL slot, the number of TX chains may be greater than 1 and the number of SRS resource sets may be greater than or equal to 1.

In some other implementations, each of the SRS resource sets may comprise up to 14 symbols of a respective UL slot and include up to 6 SRS resources. In some instances where each SRS resource set comprises up to 14 symbols of a UL slot, the number of SRS resources in each of the SRS resource sets may be dynamically configured based at least in part on changes in UL traffic patterns from the network node. In some other instances where each SRS resource set comprises up to 14 symbols of a UL slot, the number of SRS resources may be the same in each of the SRS resource sets. Still further, in some instances where each SRS resource set comprises up to 14 symbols of a UL slot, the number of SRS resources in one of the SRS resource sets may be different than the number of SRS resources in another of the SRS resource sets.

FIG. 11B shows a flowchart illustrating an example process 1110 for wireless communication that supports scheduling SRS resource sets for devices with multiple RX antennas according to some other implementations. In some implementations, the process 1110 may be performed by a wireless communication device operating as or within a UE, such as one of the UEs 704, 804, or 904 described above with reference to FIGS. 6, 7, and 8, respectively.

With reference for example to FIG. 11A, the process 1110 may be a more detailed implementation of the antenna switching capability reporting operation described in block 1102 of the process 1100. For example, the process 1110 may begin, in block 1112, before the reception of the schedule for a number of SRS resource sets in block 1104 and before the transmission of the one or more SRS resources to the first deice in block 1106 of the process 1100.

In block 1112, the process 1110 begins by changing an active bandwidth part (BWP) associated with the wireless communication device. As described above with reference to FIG. 7, a UE may have a different active BWP when located at the center of a cell coverage area than when located at the edge of the cell coverage area. In block 1114, the process 1110 proceeds with reporting a different number of RX antenna ports or TX chains based on the change in the active BWP. For example, the UE may report greater antenna switching capabilities when located at the cell center and may report more limited antenna switching capabilities when located at the cell edge. In some implementations, the antenna switching capability report may indicate a per-BWP antenna switching capability of the UE.

FIG. 11C shows a flowchart illustrating an example process 1120 for wireless communication that supports scheduling SRS resource sets for devices with multiple RX antennas according to some other implementations. In some implementations, the process 1120 may be performed by a wireless communication device operating as or within a UE, such as one of the UEs 704, 804, or 904 described above with reference to FIGS. 6, 7, and 8, respectively.

With reference for example to FIG. 11A, the process 1120 may be a more detailed implementation of the antenna switching capability reporting operation described in block 1102 of the process 1100. For example, the process 1120 may begin, in block 1122, before the reception of the schedule for a number of SRS resource sets in block 1104 and before the transmission of the one or more SRS resources to the first deice in block 1106 of the process 1100.

In block 1122, the process 1120 begins by changing a power saving configuration of the wireless communication device. As described above with reference to FIG. 8, it may be desirable to dynamically change the number of active RX channels when switching between a low-power state and a full-power state. In block 1124, the process 1120 proceeds with reporting a different number of RX antenna ports or TX chains based on the change in the power saving configuration. For example, the UE may report greater antenna switching capabilities when operating at full power and may report more limited antenna switching capabilities when operating in a low-power state.

Figure 12:
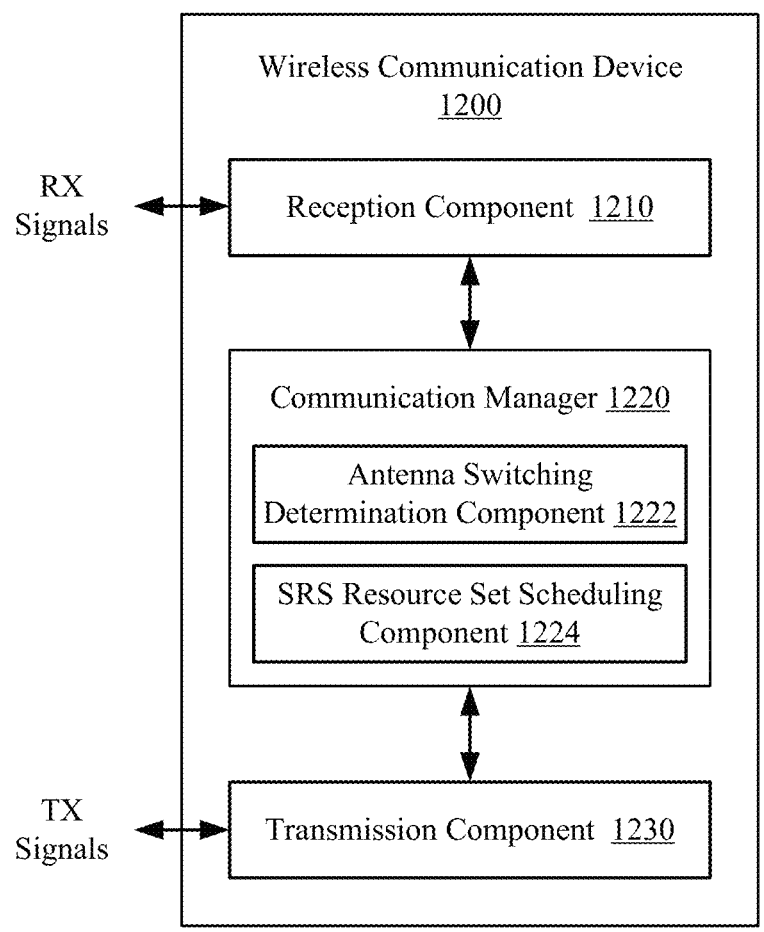
FIG. 12 shows a block diagram of an example wireless communication device according to some implementations.

FIG. 12 shows a block diagram of an example wireless communication device 1200 according to some implementations. In some implementations, the wireless communication device 1200 is configured to perform any of the processes 1000 or 1010 described above with reference to FIGS. 10A and 10B, respectively. The wireless communication device 1200 can be an example implementation of any of the base stations 102 or 310 described above with reference to FIGS. 1 and 3, respectively. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes an antenna switching determination component 1222 and an SRS resource set scheduling component 1224. Portions of one or more of the components 1222 and 1224 may be implemented at least in part in hardware or firmware. In some implementations, at least some of the components 1222 or 1224 are implemented at least in part as software stored in a memory (such as the memory 376). For example, portions of one or more of the components 1222 and 1224 can be implemented as non-transitory instructions (or "code") executable by a processor (such as the controller/processor 375) to perform the functions or operations of the respective component.

The reception component 1210 is configured to receive RX signals representing UL communications from a UE. The transmission component 1230 is configured to transmit TX signals representing DL communications to the UE. The communication manager 1220 is configured to control or manage DL and UL communications with the UE. In some implementations, the antenna switching determination component 1222 may determine an antenna switching capability of UE, where the antenna switching capability represents a number of RX antenna ports of the UE; and the SRS resource set scheduling component 1224 may schedule a number of SRS resource sets for the UE based on the number of RX antenna ports in excess of four.

Figure 13:
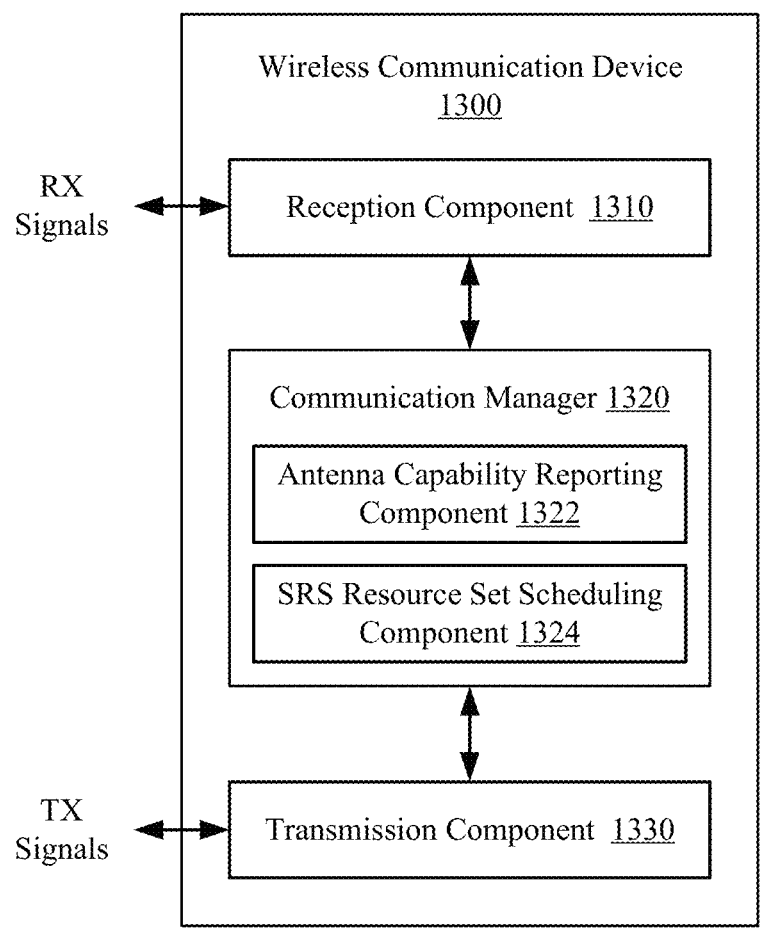
FIG. 13 shows a block diagram of an example wireless communication device according to some implementations.

FIG. 13 shows a block diagram of an example wireless communication device 1300 according to some implementations. In some implementations, the wireless communication device 1300 is configured to perform any of the processes 1100-1120 described above with reference to FIGS. 11A-11C, respectively. The wireless communication device 1300 can be an example implementation of any of the UEs 104 or 350 described above with reference to FIGS. 1 and 3, respectively. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes an antenna capability reporting component 1322 and an SRS resource set scheduling component 1324. Portions of one or more of the components 1322 and 1324 may be implemented at least in part in hardware or firmware. In some implementations, at least some of the components 1322 or 1324 are implemented at least in part as software stored in a memory (such as the memory 360). For example, portions of one or more of the components 1322 and 1324 can be implemented as non-transitory instructions (or "code") executable by a processor (such as the controller/processor 359) to perform the functions or operations of the respective component.

The reception component 1310 is configured to receive RX signals representing DL communications from a network node. The transmission component 1330 is configured to transmit TX signals representing UL communications to the network node. The communication manager 1320 is configured to control or manage DL and UL communications with the network node. In some implementations, the antenna capability reporting component 1322 may report, to the network node, an antenna switching capability indicating at least a number of RX antenna ports greater than four; and the SRS resource set scheduling component 1324 may receive a schedule for a number of SRS resource sets based on the reported antenna switching capability.

As used herein, a phrase referring to "at least one of" or "one or more of" a list of items refers to any combination of those items, including single members. For example, "at least one of a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A device for wireless communication, comprising:
one or more memories; and
one or more processors, coupled to the one or more memories, configured to:
receive an indication of a number of receive (RX) antenna ports of a user equipment (UE) and a number of transmit (TX) chains of the UE switchably coupled to two or more of the RX antenna ports,
a number of sounding reference signal (SRS) resource sets configured for the UE being based on the number of the TX chains and based on the number of the RX antenna ports being in excess of four,
each SRS resource set, of the number of the SRS resource sets, being provided in a different uplink (UL) slot,
each SRS resource set, of the number of the SRS resource sets, including up to 3 SRS resources, and
wherein either:
the number of the TX chains is equal to 1 and the number of the SRS resource sets is greater than 2, or
the number of the TX chains is greater than 1 and the number of the SRS resource sets is greater than or equal to 1; and
receive UL transmissions of one or more SRS resources for each SRS resource set of the number of the SRS resource sets.

2. The device of claim 1, wherein a SRS resource set, of the number of the SRS resource sets, is allocated to the last 6 symbols of a respective UL slot.

3. The device of claim 1, wherein each SRS resource set, of the number of the SRS resource sets, is associated with the last 6 symbols of a respective UL slot.

4. The device of claim 1, wherein each SRS resource set, of the number of the SRS resource sets, includes up to 2 SRS resources.

5. The device of claim 1, wherein each SRS resource set, of the number of the SRS resource sets, includes up to 2 SRS resources, the number of the TX chains is equal to 1, and the number of the SRS resource sets is greater than 2.

6. The device of claim 1, wherein each SRS resource set, of the number of the SRS resource sets, includes up to 2 SRS resources, the number of the TX chains is greater than 1, and the number of the SRS resource sets is greater than or equal to 1.

7. The device of claim 1, wherein the number of the RX antenna ports is equal to 6 or 8.

8. A method of wireless communication, comprising:
receiving an indication of a number of receive (RX) antenna ports of a user equipment (UE) and a number of transmit (TX) chains of the UE switchably coupled to two or more of the RX antenna ports,
a number of sounding reference signal (SRS) resource sets configured for the UE being based on the number of the TX chains and based on the number of the RX antenna ports being in excess of four,
a number of sounding reference signal (SRS) resource sets configured for the UE being based on the number of the TX chains and based on the number of the RX antenna ports being in excess of four,
each SRS resource set, of the number of the SRS resource sets, being provided in a different uplink (UL) slot,
each SRS resource set, of the number of the SRS resource sets, including up to 3 SRS resources, and
wherein either:
the number of the TX chains is equal to 1 and the number of the SRS resource sets is greater than 2, or
the number of the TX chains is greater than 1 and the number of the SRS resource sets is greater than or equal to 1; and
receiving UL transmissions of one or more SRS resources for each SRS resource set of the number of the SRS resource sets.

9. The method of claim 8, wherein each SRS resource set, of the number of the SRS resource sets, includes up to 2 SRS resources.

10. The method of claim 8, wherein the number of the RX antenna ports is equal to 6 or 8.

11. A user equipment (UE) for wireless communication, comprising:
one or more memories; and
one or more processors, coupled to the one or more memories, configured to:

transmit an indication of a number of receive (RX) antenna ports and a number of transmit (TX) chains switchably coupled to two or more of the RX antenna ports,
    a number of sounding reference signal (SRS) resource sets configured for the UE being based on the number of the TX chains and based on the number of the RX antenna ports being in excess of four,
    each SRS resource set, of the number of the SRS resource sets, being provided in a different uplink (UL) slot,
    each SRS resource set, of the number of the SRS resource sets, including up to 3 SRS resources, and
    wherein either:
        the number of the TX chains is equal to 1 and the number of the SRS resource sets is greater than 2, or
        the number of the TX chains is greater than 1 and the number of the SRS resource sets is greater than or equal to 1; and
    transmit one or more SRS resources for each SRS resource set of the number of the SRS resource sets.

12. The UE of claim 11, wherein a SRS resource set, of the number of the SRS resource sets, is allocated to the last 6 symbols of a respective UL slot.

13. The UE of claim 11, wherein each SRS resource set, of the number of the SRS resource sets, is associated with the last 6 symbols of a respective UL slot.

14. The UE of claim 11, wherein each SRS resource set, of the number of the SRS resource sets, includes up to 2 SRS resources.

15. The UE of claim 11, wherein each SRS resource set, of the number of the SRS resource sets, includes up to 2 SRS resources, the number of the TX chains is equal to 1, and the number of the SRS resource sets is greater than 2.

16. The UE of claim 11, wherein each SRS resource set, of the number of the SRS resource sets, includes up to 2 SRS resources, the number of the TX chains is greater than 1, and the number of the SRS resource sets is greater than or equal to 1.

17. The UE of claim 11, wherein the number of the RX antenna ports is equal to 6 or 8.

18. A method of wireless communication performed by a user equipment (UE), comprising:
    transmitting an indication of a number of receive (RX) antenna ports and a number of transmit (TX) chains switchably coupled to two or more of the RX antenna ports,
        a number of sounding reference signal (SRS) resource sets configured for the UE being based on the number of the TX chains and based on the number of the RX antenna ports being in excess of four,
        each SRS resource set, of the number of the SRS resource sets, being provided in a different uplink (UL) slot,
        each SRS resource set, of the number of the SRS resource sets, including up to 3 SRS resources, and
        wherein either:
            the number of the TX chains is equal to 1 and the number of the SRS resource sets is greater than 2, or
            the number of the TX chains is greater than 1 and the number of the SRS resource sets is greater than or equal to 1; and
    transmitting one or more SRS resources for each SRS resource set of the number of the SRS resource sets.

19. The method of claim 18, wherein each SRS resource set, of the number of the SRS resource sets, includes up to 2 SRS resources.

20. The method of claim 18, wherein the number of the RX antenna ports is equal to 6 or 8.

* * * * *